(12) United States Patent
Matheney et al.

(10) Patent No.: US 6,483,461 B1
(45) Date of Patent: Nov. 19, 2002

(54) APPARATUS AND METHOD FOR LOCATING OBJECTS IN A THREE-DIMENSIONAL SPACE

(75) Inventors: Jack Thomas Matheney, Madison; Linda M. Lee, Harvest, both of AL (US); Donald David Mondul, Dallas, TX (US)

(73) Assignee: Time Domain Corporation, Huntsville, AL (US)

( * ) Notice: Subject to any disclaimer, the term of this patent is extended or adjusted under 35 U.S.C. 154(b) by 0 days.

(21) Appl. No.: 09/645,921

(22) Filed: Aug. 24, 2000

(51) Int. Cl.[7] .................................................. G01S 3/02
(52) U.S. Cl. ........................................ 342/463; 342/457
(58) Field of Search ................................. 342/463, 457

(56) References Cited

U.S. PATENT DOCUMENTS

| | | |
|---|---|---|
| 3,068,473 A | 12/1962 | Muth et al. |
| 3,213,449 A | 10/1965 | Kobayashi |
| 3,376,504 A | 4/1968 | Chick |
| 3,396,393 A | 8/1968 | Wagner |

(List continued on next page.)

*Primary Examiner*—Theodore M. Blum
(74) *Attorney, Agent, or Firm*—Law Office of Donald D. Mondul

(57) ABSTRACT

A system for locating of objects in a three-dimensional space comprises: (a) an impulse radio network including at least three reference impulse radio units and at least one mobile position indicating apparatus; position information relating the impulse radio units is recorded by at least one indicating impulse radio unit; the impulse radio units are in communication; and (b) an affixing structure for affixing a respective mobile position indicating apparatus with a respective object. A respective mobile position indicating apparatus transmits an impulse radio identifying signal that is received by a receiving impulse radio unit. An indicating impulse radio unit cooperates with the receiving impulse radio unit in using the identifying signal for developing coordinate information for locating the respective mobile position indicating apparatus. The method comprises the steps of: (a) providing an impulse radio network including at least three reference impulse radio units and at least one mobile position indicating apparatus; position information relating the impulse radio units is recorded by at least one indicating impulse radio unit; the impulse radio units are in communication; (b) providing an affixing structure for affixing a respective mobile position indicating apparatus with a respective object; (c) transmitting an impulse radio identifying signal from a respective mobile position indicating apparatus; (d) Receiving the identifying signal by a receiving impulse radio unit; and (e) operating an indicating impulse radio unit in cooperation with the receiving impulse radio unit to determine the location of the mobile position indicating apparatus.

20 Claims, 24 Drawing Sheets

U.S. PATENT DOCUMENTS

| | | | |
|---|---|---|---|
| 3,461,452 A | | 8/1969 | Welter |
| 4,161,730 A | | 7/1979 | Anderson et al. |
| 4,315,260 A | | 2/1982 | Kupfer |
| 4,543,580 A | | 9/1985 | Bent et al. |
| 4,641,317 A | | 2/1987 | Fullerton ................... 375/1 |
| 4,743,906 A | | 5/1988 | Fullerton ................... 342/27 |
| 4,813,057 A | | 3/1989 | Fullerton ................... 375/37 |
| 4,916,429 A | | 4/1990 | Hicks et al. |
| 4,916,455 A | | 4/1990 | Bent et al. |
| 4,979,186 A | | 12/1990 | Fullerton ................... 375/23 |
| 5,216,429 A | | 6/1993 | Nakagawa |
| 5,278,568 A | * | 1/1994 | Enge et al. ................ 342/367 |
| 5,363,108 A | | 11/1994 | Fullerton ................... 342/27 |
| 5,497,160 A | | 3/1996 | Koehler et al. |
| 5,499,029 A | | 3/1996 | Bashforth et al. |
| 5,510,800 A | | 4/1996 | McEwan |
| 5,552,772 A | * | 9/1996 | Janky et al. |
| 5,589,838 A | | 12/1996 | McEwan |
| 5,661,490 A | | 8/1997 | McEwan |
| 5,661,492 A | * | 8/1997 | Shoap et al. |
| 5,677,927 A | | 10/1997 | Fullerton et al. ........... 375/200 |
| 5,687,169 A | | 11/1997 | Fullerton ................... 370/324 |
| 5,748,891 A | | 5/1998 | Fleming et al. |
| 5,796,366 A | | 8/1998 | Grebnev et al. |
| 5,809,424 A | | 9/1998 | Eizenhoefer |
| 5,832,035 A | | 11/1998 | Fullerton ................... 375/210 |
| 5,859,612 A | | 1/1999 | Gilhousen |
| 5,912,644 A | * | 6/1999 | Wang |
| 5,933,079 A | | 8/1999 | Frink |
| 6,002,708 A | | 12/1999 | Fleming et al. |
| 6,054,950 A | | 4/2000 | Fontana |

* cited by examiner

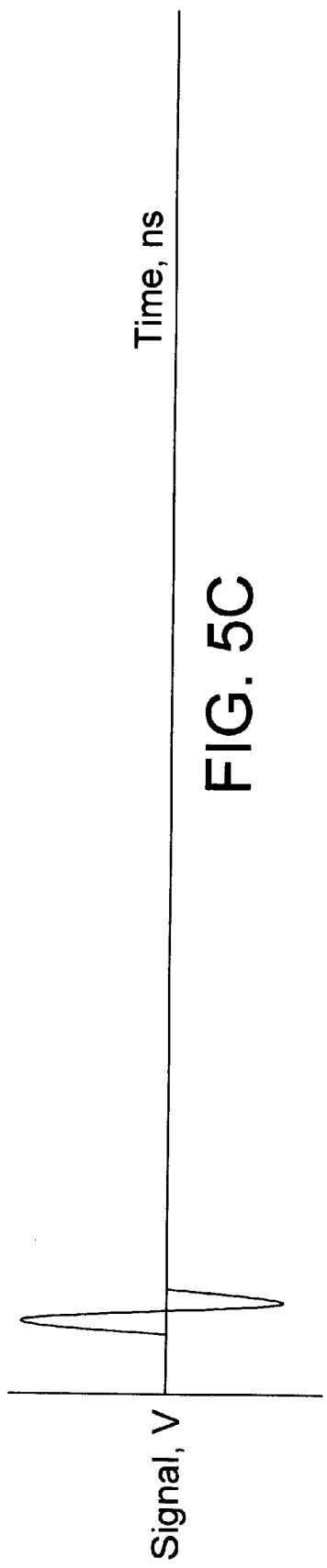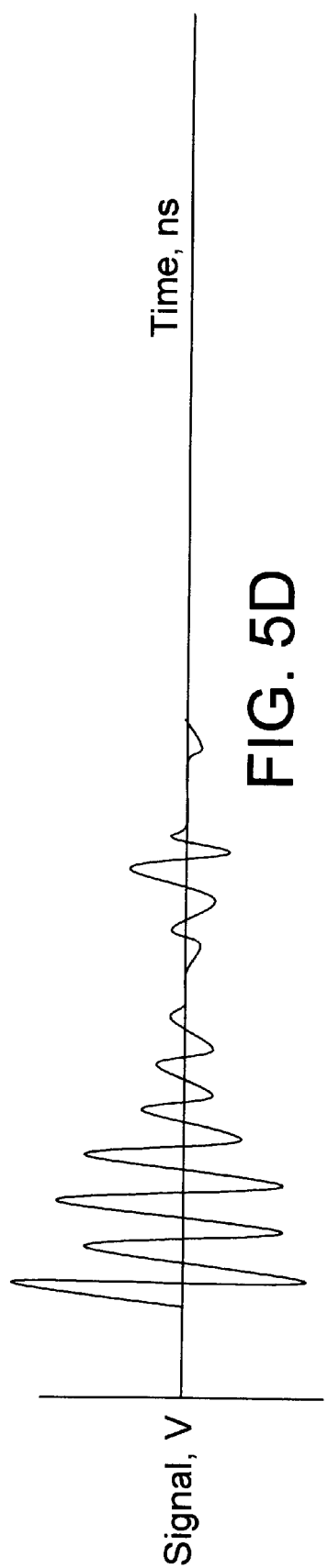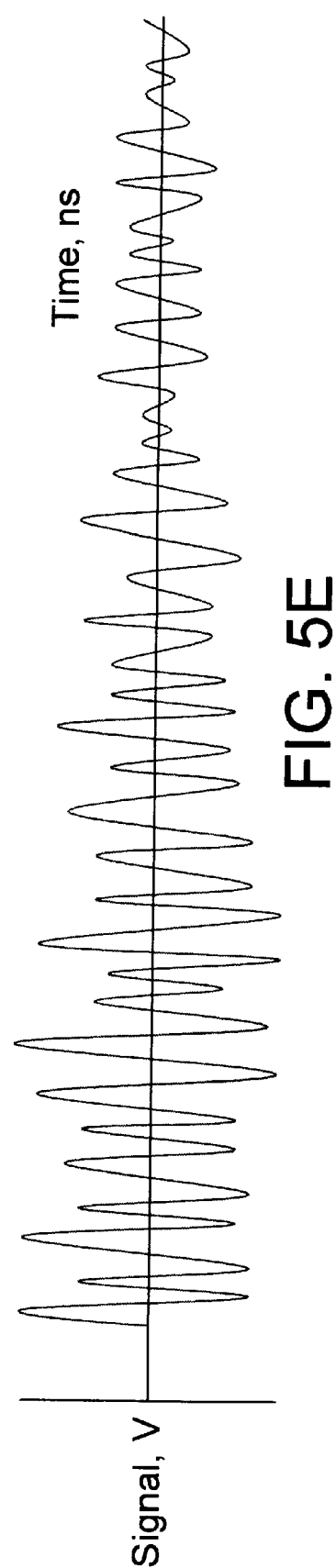

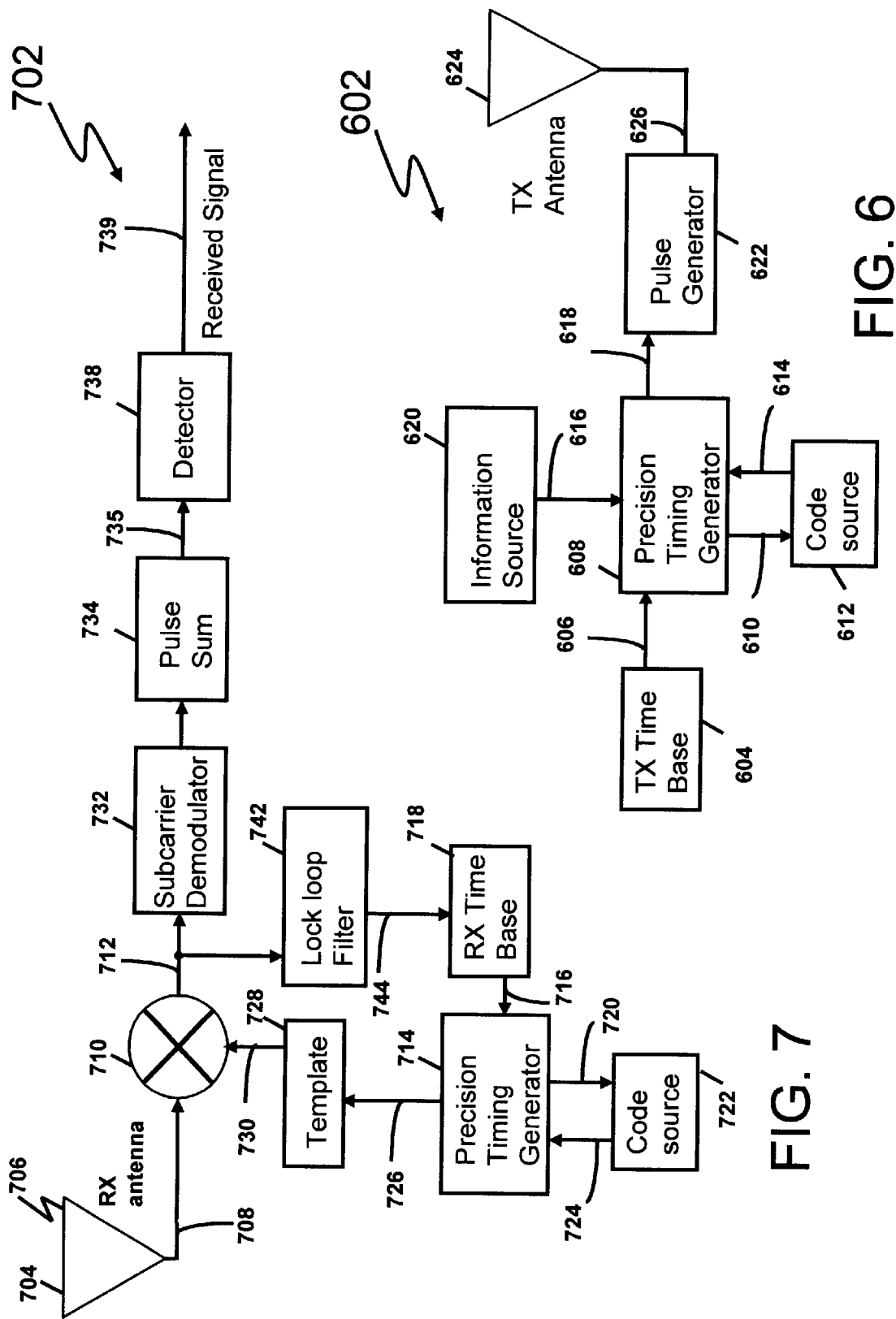

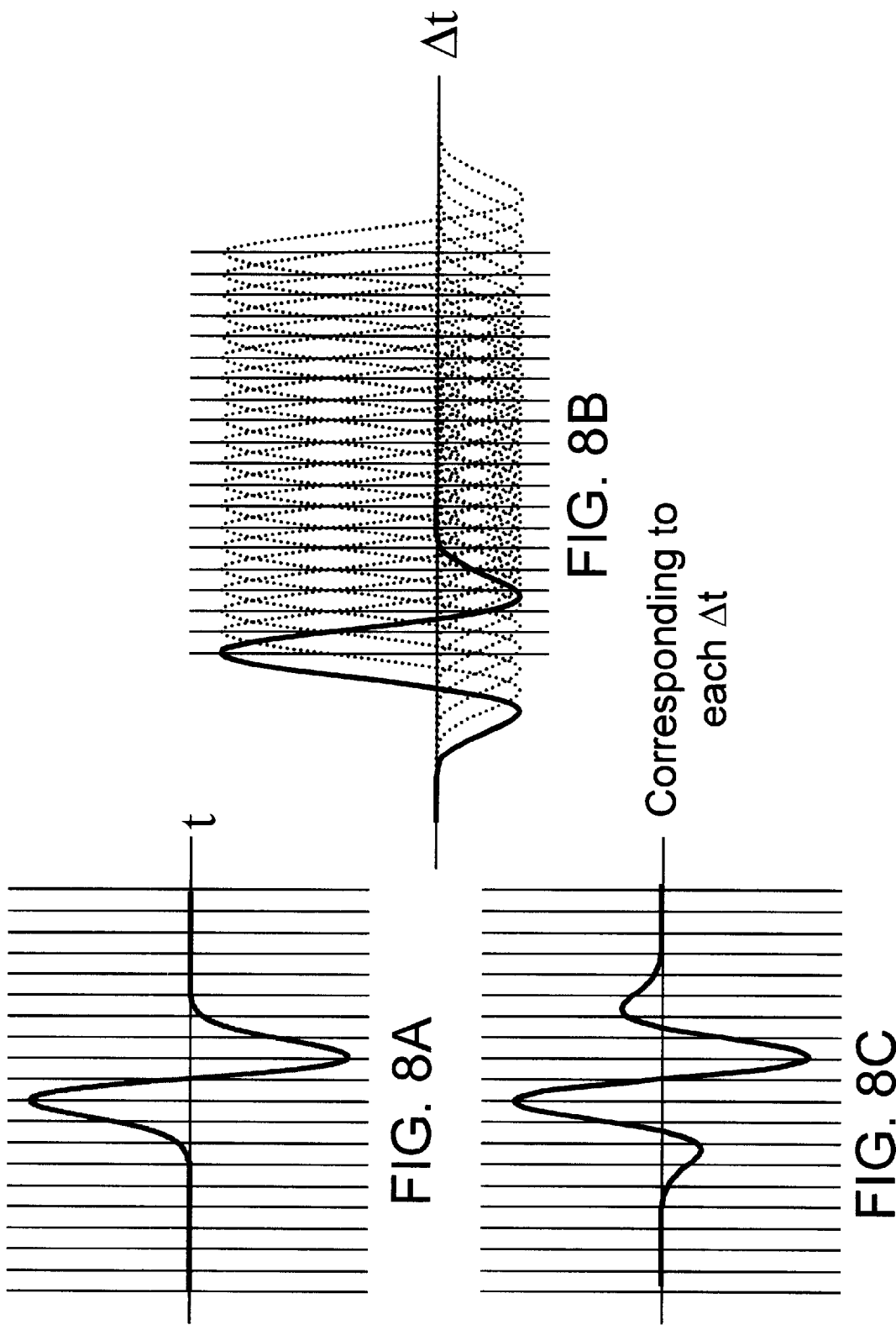

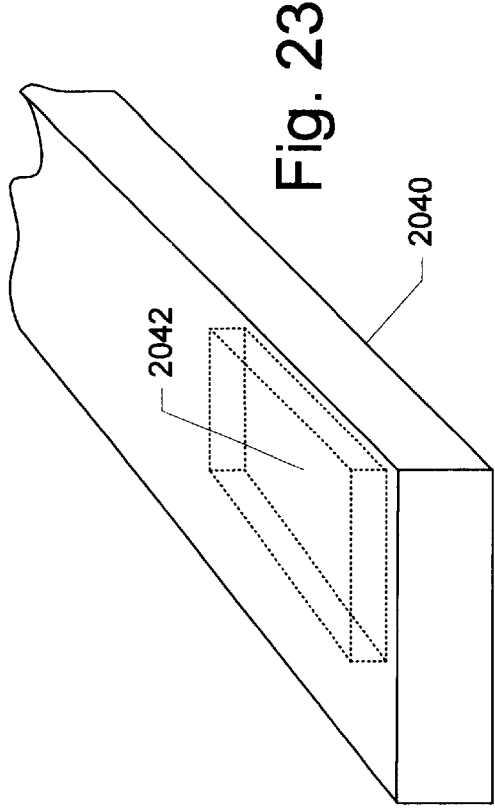
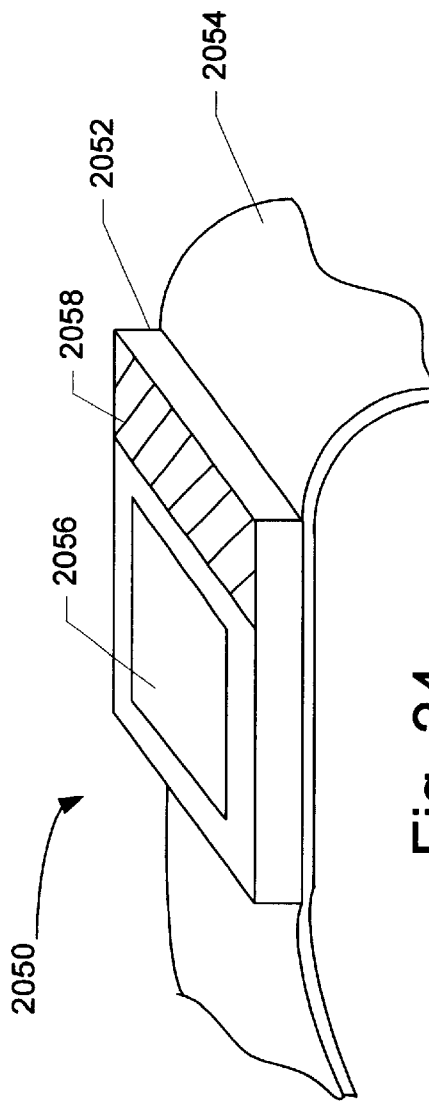
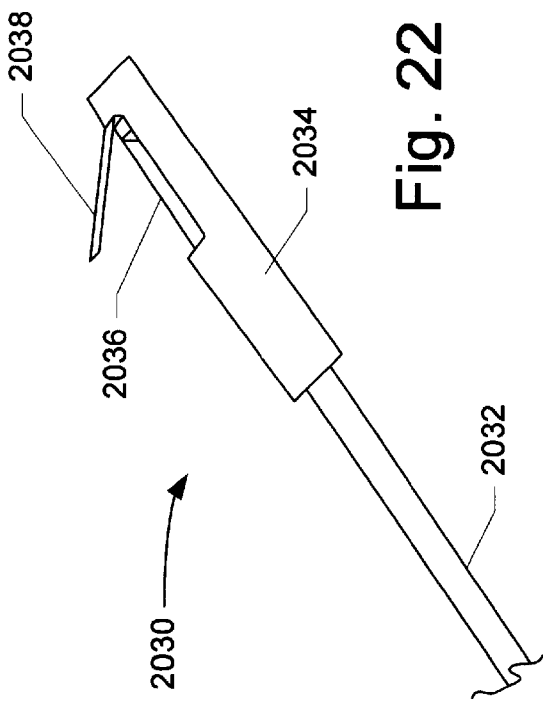

APPARATUS AND METHOD FOR LOCATING OBJECTS IN A THREE-DIMENSIONAL SPACE

BACKGROUND OF THE INVENTION

1. Field of the Invention

The present invention relates generally to position determination in a three-dimensional space effected using impulse radio equipment and methods. Still more particularly the present invention provides a system and method for determining position of mobile units attached to objects or to people within a three-dimensional space. The locating may be carried out from mobile units, from fixed units or from a combination of mobile and fixed units.

The apparatus and method of the present invention are particularly useful for keeping track of rental equipment being used within the three-dimensional space or about to leave the three-dimensional space. Further useful application of the present invention are provision of location information for display to persons traveling about within the three-dimensional space and locating persons lost within the three-dimensional space. One example of a useful such application is persons using facilities of a ski resort. The apparatus and method of the present invention can be employed to provide location information to human operators, such as skiers, to keep from becoming lost. Perhaps most important, the compact lightweight nature of the apparatus of the present invention, and the ability to locate persons in three dimensions from mobile units (such as ski patrol or other rescue personnel) affords a ready capability to find persons buried by an avalanche in time to rescue them alive.

There is a need for a locating apparatus and method that provides lightweight, robust and reliable mobility with a capability for locating objects and people in a three-dimensional space of geographic proportions, such as a ski resort.

2. Related Art

Recent advances in communications technology have enabled an emerging, revolutionary ultra wideband technology (UWB) called impulse radio communications systems (hereinafter called impulse radio).

Impulse radio was first fully described in a series of patents, including U.S. Pat. Nos. 4,641,317 (issued Feb. 3, 1987), U.S. Pat. No. 4,813,057 (issued Mar. 14, 1989), U.S. Pat. No. 4,979,186 (issued Dec. 18, 1990) and U.S. Pat. No. 5,363,108 (issued Nov. 8, 1994) to Larry W. Fullerton. A second generation of impulse radio patents include U.S. Pat. Nos. 5,677,927 (issued Oct. 14, 1997) to Fullerton et al; and U.S. Pat. No. 5,687,169 (issued Nov. 11, 1997) and U.S. Pat. No. 5,832,035 (issued Nov. 3, 1998) to Fullerton. These patent documents are incorporated herein by reference.

Uses of impulse radio systems are described in U.S. patent application Ser. No. 09/332,502, entitled, "System and Method for Intrusion Detection Using a Time Domain Radar Array," and U.S. patent application Ser. No. 09/332,503, entitled, "Wide Area Time Domain Radar Array," both filed the same day as the present application, Jun. 14, 1999, both of which are assigned to the assignee of the present invention, and both of which are incorporated herein by reference.

Basic impulse radio transmitters emit short pulses approaching a Gaussian monocycle with tightly controlled pulse-to-pulse intervals. Impulse radio systems typically use pulse position modulation, which is a form of time modulation where the value of each instantaneous sample of a modulating signal is caused to modulate the position of a pulse in time.

For impulse radio communications, the pulse-to-pulse interval is varied on a pulse-by-pulse basis by two components: an information component and a pseudo-random code component. Unlike direct sequence spread spectrum systems, the pseudo-random code for impulse radio communications is not necessary for energy spreading because the monocycle pulses themselves have an inherently wide bandwidth. Instead, the pseudo-random code of an impulse radio system is used for channelization, energy smoothing in the frequency domain and for interference suppression.

Generally speaking, an impulse radio receiver is a direct conversion receiver with a cross correlator front end. The front end coherently converts an electromagnetic pulse train of monocycle pulses to a baseband signal in a single stage. The data rate of the impulse radio transmission is typically a fraction of the periodic timing signal used as a time base. Because each data bit modulates the time position of many pulses of the periodic timing signal, this yields a modulated, coded timing signal that comprises a train of identically shaped pulses for each single data bit. The impulse radio receiver integrates multiple pulses to recover the transmitted information.

In a multi-user environment, impulse radio depends, in part, on processing gain to achieve rejection of unwanted signals. Because of the extremely high processing gain achievable with impulse radio, much higher dynamic ranges are possible than are commonly achieved with other spread spectrum methods, some of which must use power control in order to have a viable system. Further, if power is kept to a minimum in an impulse radio system, this will allow closer operation in co-site or nearly co-site situations where two impulse radios must operate concurrently, or where an impulse radio and a narrow band radio must operate close by one another and share the same band.

In some multi-user environments where there is a high density of users in a coverage area or where data rates are so high that processing gain is marginal, power control may be used to reduce the multi-user background noise to improve the number of channels available and the aggregate traffic density of the area.

Other sources of noise, or electromagnetic interference, may also interfere with efficient communication using impulse radio technology. In communicating voice messages, data messages, control messages, or other types of messages, interference causes problems by corrupting information intended to be conveyed by the transmission message.

There is a need for mitigating the effects of electromagnetic interference, or noise, in communication using impulse radio.

In particular, there is a need for mitigating the effects of electromagnetic interference having various characteristics in communication using impulse radio.

SUMMARY OF THE INVENTION

A system for locating a plurality of objects in a three-dimensional coordinate system comprises: (a) an impulse radio network including at least three reference impulse radio units and at least one mobile position indicating apparatus; position information relating the reference impulse radio units is recorded by at least one indicating reference impulse radio unit; the reference impulse radio units being in mutual communication; and (b) an affixing structure for affixing a respective mobile position indicating apparatus with a respective object. A respective mobile position indicating apparatus transmits an impulse radio identifying signal that is received by at least one receiving reference impulse radio unit. At least one indicating reference impulse radio unit cooperates with the receiving reference impulse radio unit in using the identifying signal for developing coordinate information for locating the respective mobile position indicating apparatus.

The method comprises the steps of: (a) providing an impulse radio network including at least three reference impulse radio units and at least one mobile position indicating apparatus; position information relating the reference impulse radio units is recorded by at least one indicating reference impulse radio unit; the reference impulse radio units are in mutual communication; (b) providing an affixing structure for affixing a respective mobile position indicating apparatus with a respective object; (c) transmitting an impulse radio identifying signal from a respective mobile position indicating apparatus; (d) Receiving the identifying signal by at least one receiving reference impulse radio unit; and (e) operating at least one indicating reference impulse radio unit in cooperation with the receiving reference impulse radio unit to develop coordinate information for determining the locating of the respective mobile position indicating apparatus.

It is therefore an object of the present invention to provide an apparatus and method for locating objects and people in a three-dimensional space that is lightweight, robust and mobile.

It is a further object of the present invention to provide an apparatus and method for locating objects and people in a three-dimensional space that may be operated from mobile or fixed sites.

Further objects and features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

FIGS. 5C–5E illustrate a signal plot of various multipath environments.

FIG. 6 illustrates a representative impulse radio transmitter functional diagram.

FIG. 7 illustrates a representative impulse radio receiver functional diagram.

FIG. 8A illustrates a representative received pulse signal at the input to the correlator.

FIG. 8B illustrates a sequence of representative impulse signals in the correlation process.

FIG. 8C illustrates the output of the correlator for each of the time offsets of FIG. 8B.

FIG. 22 is a schematic drawing illustrating installation of a mobile apparatus location transmitter in a ski pole handle structure.

FIG. 23 is a schematic drawing illustrating installation of a mobile apparatus location transmitter in a ski.

FIG. 24 is a schematic drawing of a wearable mobile apparatus location transmitter device.

DETAILED DESCRIPTION OF THE EMBODIMENTS

Overview of the Invention

Figure 1B:
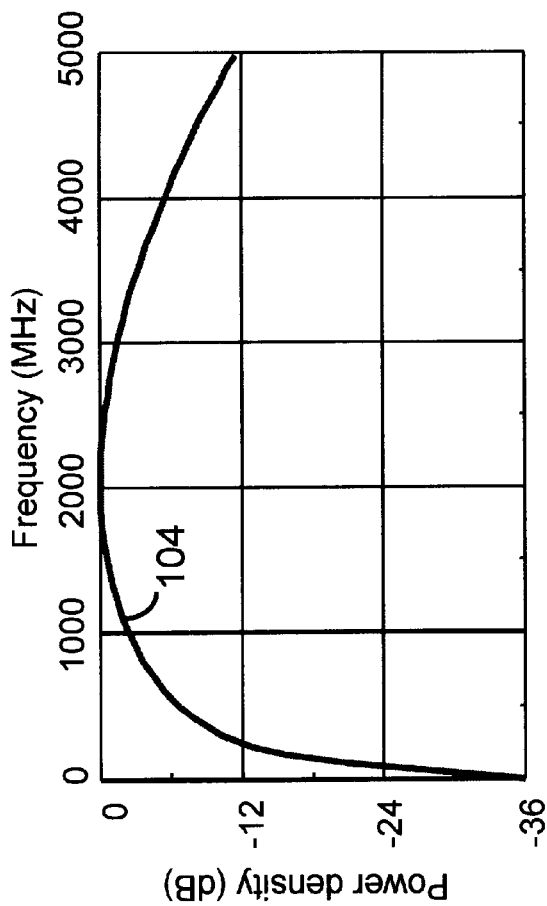
FIG. 1B illustrates the frequency domain amplitude of the Gaussian Monocycle of FIG. 1A.

The present invention will now be described more fully in detail with reference to the accompanying drawings, in which the preferred embodiments of the invention are shown. This invention should not, however, be construed as limited to the embodiments set forth herein; rather, they are provided so that this disclosure will be thorough and complete and will fully convey the scope of the invention to those skilled in art. Like numbers refer to like elements throughout.

Impulse Radio Basics

This section is directed to technology basics and provides the reader with an introduction to impulse radio concepts, as well as other relevant aspects of communications theory. This section includes subsections relating to waveforms, pulse trains, coding for energy smoothing and channelization, modulation, reception and demodulation, interference resistance, processing gain, capacity, multipath and propagation, distance measurement, and qualitative and quantitative characteristics of these concepts. It should be understood that this section is provided to assist the reader with understanding the present invention, and should not be used to limit the scope of the present invention.

Impulse radio refers to a radio system based on short, low duty cycle pulses. An ideal impulse radio waveform is a short Gaussian monocycle. As the name suggests, this waveform attempts to approach one cycle of radio frequency (RF) energy at a desired center frequency. Due to implementation and other spectral limitations, this waveform may be altered significantly in practice for a given application. Most waveforms with enough bandwidth approximate a Gaussian shape to a useful degree.

Impulse radio can use many types of modulation, including AM, time shift (also referred to as pulse position) and M-ary versions. The time shift method has simplicity and power output advantages that make it desirable. In this document, the time shift method is used as an illustrative example.

In impulse radio communications, the pulse-to-pulse interval can be varied on a pulse-by-pulse basis by two components: an information component and a pseudo-random code component. Generally, conventional spread spectrum systems make use of pseudo-random codes to spread the normally narrow band information signal over a relatively wide band of frequencies. A conventional spread spectrum receiver correlates these signals to retrieve the original information signal. Unlike conventional spread spectrum systems, the pseudo-random code for impulse radio communications is not necessary for energy spreading because the monocycle pulses themselves have an inherently wide bandwidth. Instead, the pseudo-random code is used for channelization, energy smoothing in the frequency domain, resistance to interference, and reducing the interference potential to nearby receivers.

The impulse radio receiver is typically a direct conversion receiver with a cross correlator front end in which the front end coherently converts an electromagnetic pulse train of monocycle pulses to a baseband signal in a single stage. The baseband signal is the basic information signal for the impulse radio communications system. It is often found desirable to include a subcarrier with the baseband signal to help reduce the effects of amplifier drift and low frequency noise. The subcarrier that is typically implemented alternately reverses modulation according to a known pattern at a rate faster than the data rate. This same pattern is used to reverse the process and restore the original data pattern just before detection. This method permits alternating current (AC) coupling of stages, or equivalent signal processing to eliminate direct current (DC) drift and errors from the detection process. This method is described in detail in U.S. Pat. No. 5,677,927 to Fullerton et al.

In impulse radio communications utilizing time shift modulation, each data bit typically time position modulates many pulses of the periodic timing signal. This yields a modulated, coded timing signal that comprises a train of identically shaped pulses for each single data bit. The impulse radio receiver integrates multiple pulses to recover the transmitted information.

Waveforms

Impulse radio refers to a radio system based on short, low duty cycle pulses. In the widest bandwidth embodiment, the resulting waveform approaches one cycle per pulse at the center frequency. In more narrow band embodiments, each pulse consists of a burst of cycles usually with some spectral shaping to control the bandwidth to meet desired properties such as out of band emissions or in-band spectral flatness, or time domain peak power or burst off time attenuation.

For system analysis purposes, it is convenient to model the desired waveform in an ideal sense to provide insight into the optimum behavior for detail design guidance. One such waveform model that has been useful is the Gaussian monocycle as shown in FIG. 1A. This waveform is representative of the transmitted pulse produced by a step function into an ultra-wideband antenna. The basic equation normalized to a peak value of 1 is as follows:

$$f_{mono}(t) = \sqrt{e}\left(\frac{t}{\sigma}\right)e^{\frac{-t^2}{2\sigma^2}}$$

Where, $\sigma$ is a time scaling parameter, t is time, $f_{mono}(t)$ is the waveform voltage, and e is the natural logarithm base.

Figure 1A:
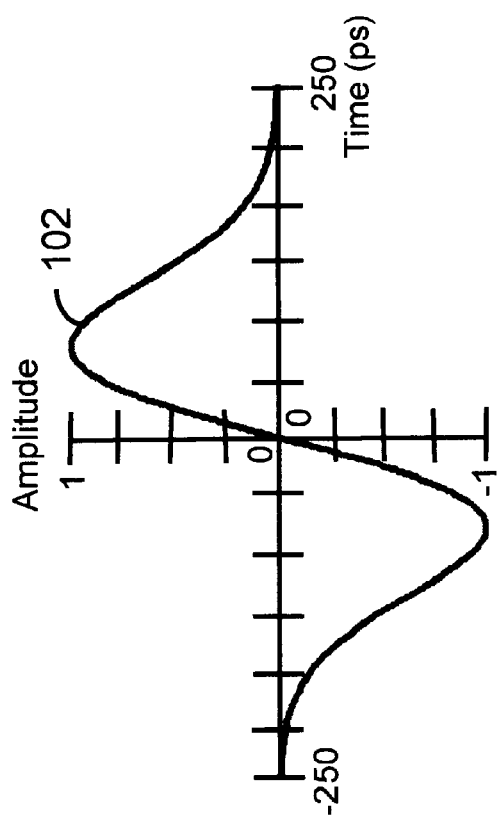
FIG. 1A illustrates a representative Gaussian Monocycle waveform in the time domain.

The frequency domain spectrum of the above waveform is shown in FIG. 1B. The corresponding equation is:

$$F_{mono}(f) = (2\pi)^{3/2}\sigma f e^{-2(\pi\sigma f)^2}$$

The center frequency ($f_c$), or frequency of peak spectral density is:

$$f_c = \frac{1}{2\pi\sigma}$$

These pulses, or bursts of cycles, may be produced by methods described in the patents referenced above or by other methods that are known to one of ordinary skill in the art. Any practical implementation will deviate from the ideal mathematical model by some amount. In fact, this deviation from ideal may be substantial and yet yield a system with acceptable performance. This is especially true for microwave implementations, where precise waveform shaping is difficult to achieve. These mathematical models are provided as an aid to describing ideal operation and are not intended to limit the invention. In fact, any burst of cycles that adequately fills a given bandwidth and has an adequate on-off attenuation ratio for a given application will serve the purpose of this invention.

A Pulse Train

Impulse radio systems can deliver one or more data bits per pulse; however, impulse radio systems more typically use pulse trains, not single pulses, for each data bit. As described in detail in the following example system, the impulse radio transmitter produces and outputs a train of pulses for each bit of information.

Figure 2B:
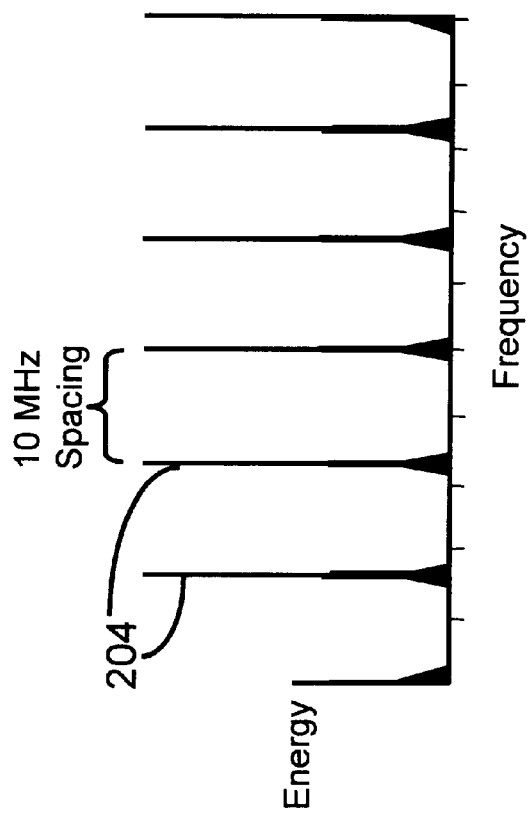
FIG. 2B illustrates the frequency domain amplitude of the waveform of FIG. 2A.
Figure 2A:
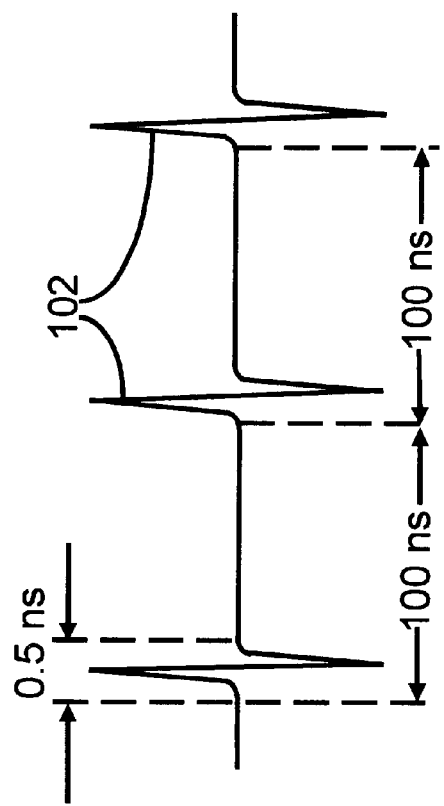
FIG. 2A illustrates a pulse train comprising pulses as in FIG. 1A.

Prototypes built by the inventors have pulse repetition frequencies including 0.7 and 10 megapulses per second (Mpps, where each megapulse is $10^6$ pulses). FIGS. 2A and 2B are illustrations of the output of a typical 10 Mpps system with uncoded, unmodulated, 0.5 nanosecond (ns) pulses 102. FIG. 2A shows a time domain representation of this sequence of pulses 102. FIG. 2B, which shows 60 MHz at the center of the spectrum for the waveform of FIG. 2A, illustrates that the result of the pulse train in the frequency domain is to produce a spectrum comprising a set of lines 204 spaced at the frequency of the 10 Mpps pulse repetition rate. When the full spectrum is shown, the envelope of the line spectrum follows the curve of the single pulse spectrum 104 of FIG. 1B. For this simple uncoded case, the power of the pulse train is spread among roughly two hundred comb lines. Each comb line thus has a small fraction of the total power and presents much less of an interference problem to receiver sharing the band.

It can also be observed from FIG. 2A that impulse radio systems typically have very low average duty cycles resulting in average power significantly lower than peak power. The duty cycle of the signal in the present example is 0.5%, based on a 0.5 ns pulse in a 100 ns interval.

Coding for Energy Smoothing and Channelization

For high pulse rate systems, it may be necessary to more finely spread the spectrum than is achieved by producing comb lines. This may be done by pseudo-randomly positioning each pulse relative to its nominal position.

Figure 3:
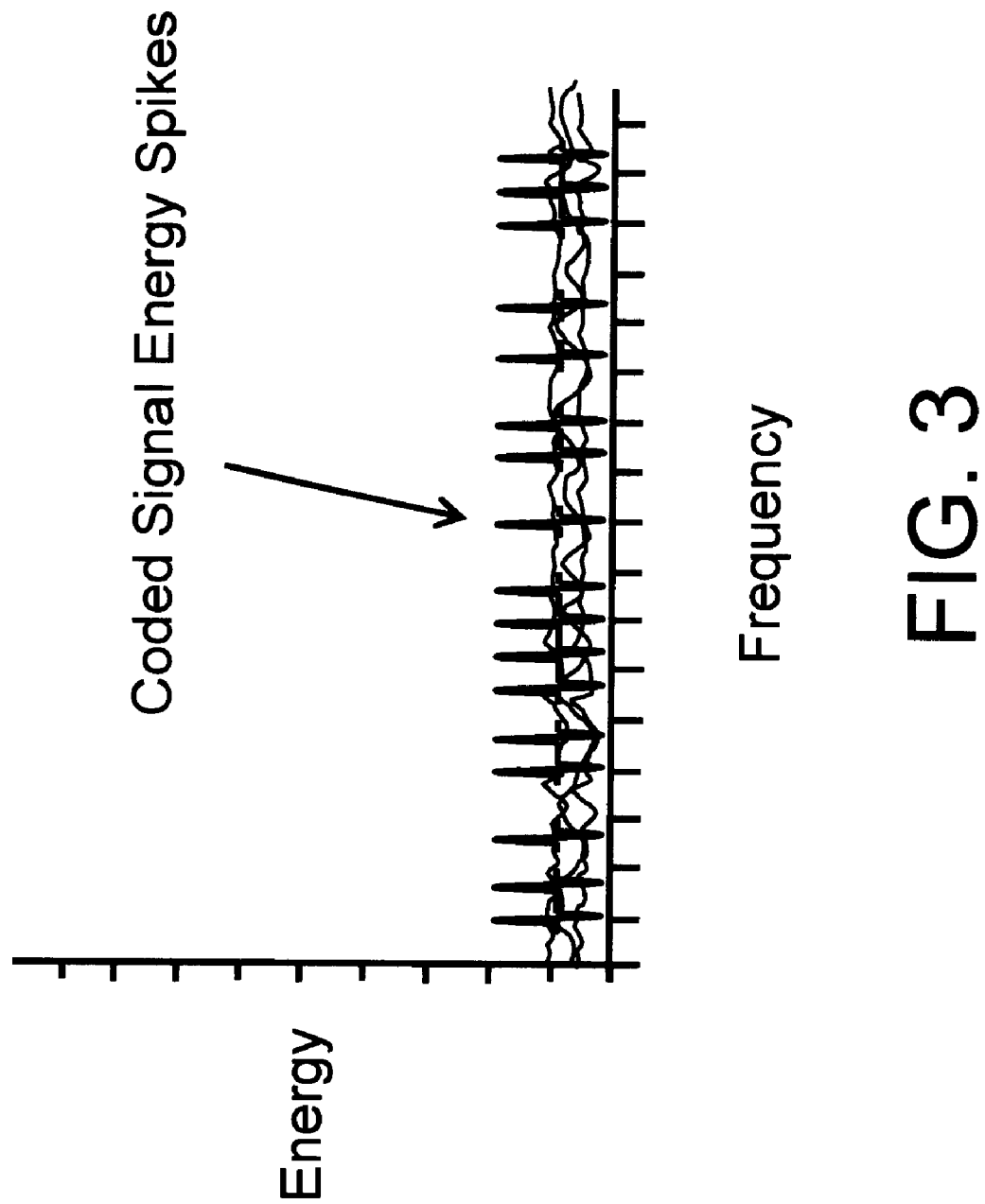
FIG. 3 illustrates the frequency domain amplitude of a sequence of time coded pulses.

FIG. 3 is a plot illustrating the impact of a pseudo-noise (PN) code dither on energy distribution in the frequency domain (A pseudo-noise, or PN code is a set of time positions defining the pseudo-random positioning for each pulse in a sequence of pulses). FIG. 3, when compared to FIG. 2B, shows that the impact of using a PN code is to destroy the comb line structure and spread the energy more uniformly. This structure typically has slight variations which are characteristic of the specific code used.

The PN code also provides a method of establishing independent communication channels using impulse radio. PN codes can be designed to have low cross correlation such that a pulse train using one code will seldom collide on more than one or two pulse positions with a pulses train using another code during any one data bit time. Since a data bit may comprise hundreds of pulses, this represents a substantial attenuation of the unwanted channel.

Modulation

Any aspect of the waveform can be modulated to convey information. Amplitude modulation, phase modulation, frequency modulation, time shift modulation and M-ary versions of these have been proposed. Both analog and digital forms have been implemented. Of these, digital time shift modulation has been demonstrated to have various advantages and can be easily implemented using a correlation receiver architecture.

Digital time shift modulation can be implemented by shifting the coded time position by an additional amount (that is, in addition to PN code dither) in response to the information signal. This amount is typically very small relative to the PN code shift. In a 10 Mpps system with a center frequency of 2 GHz., for example, the PN code may command pulse position variations over a range of 100 ns; whereas, the information modulation may only deviate the pulse position by 150 ps.

Thus, in a pulse train of n pulses, each pulse is delayed a different amount from its respective time base clock position by an individual code delay amount plus a modulation amount, where n is the number of pulses associated with a given data symbol digital bit.

Modulation further smooths the spectrum, minimizing structure in the resulting spectrum.

Reception and Demodulation

Clearly, if there were a large number of impulse radio users within a confined area, there might be mutual interference. Further, while the PN coding minimizes that interference, as the number of users rises, the probability of an individual pulse from one user's sequence being received simultaneously with a pulse from another user's sequence increases. Impulse radios are able to perform in these environments, in part, because they do not depend on receiving every pulse. The impulse radio receiver performs a correlating, synchronous receiving function (at the RF level) that uses a statistical sampling and combining of many pulses to recover the transmitted information.

Impulse radio receivers typically integrate from 1 to 1000 or more pulses to yield the demodulated output. The optimal number of pulses over which the receiver integrates is dependent on a number of variables, including pulse rate, bit rate, interference levels, and range.

Interference Resistance

Besides channelization and energy smoothing, the PN coding also makes impulse radios highly resistant to interference from all radio communications systems, including other impulse radio transmitters. This is critical as any other signals within the band occupied by an impulse signal potentially interfere with the impulse radio. Since there are currently no unallocated bands available for impulse systems, they must share spectrum with other conventional radio systems without being adversely affected. The PN code helps impulse systems discriminate between the intended impulse transmission and interfering transmissions from others.

Figure 4:
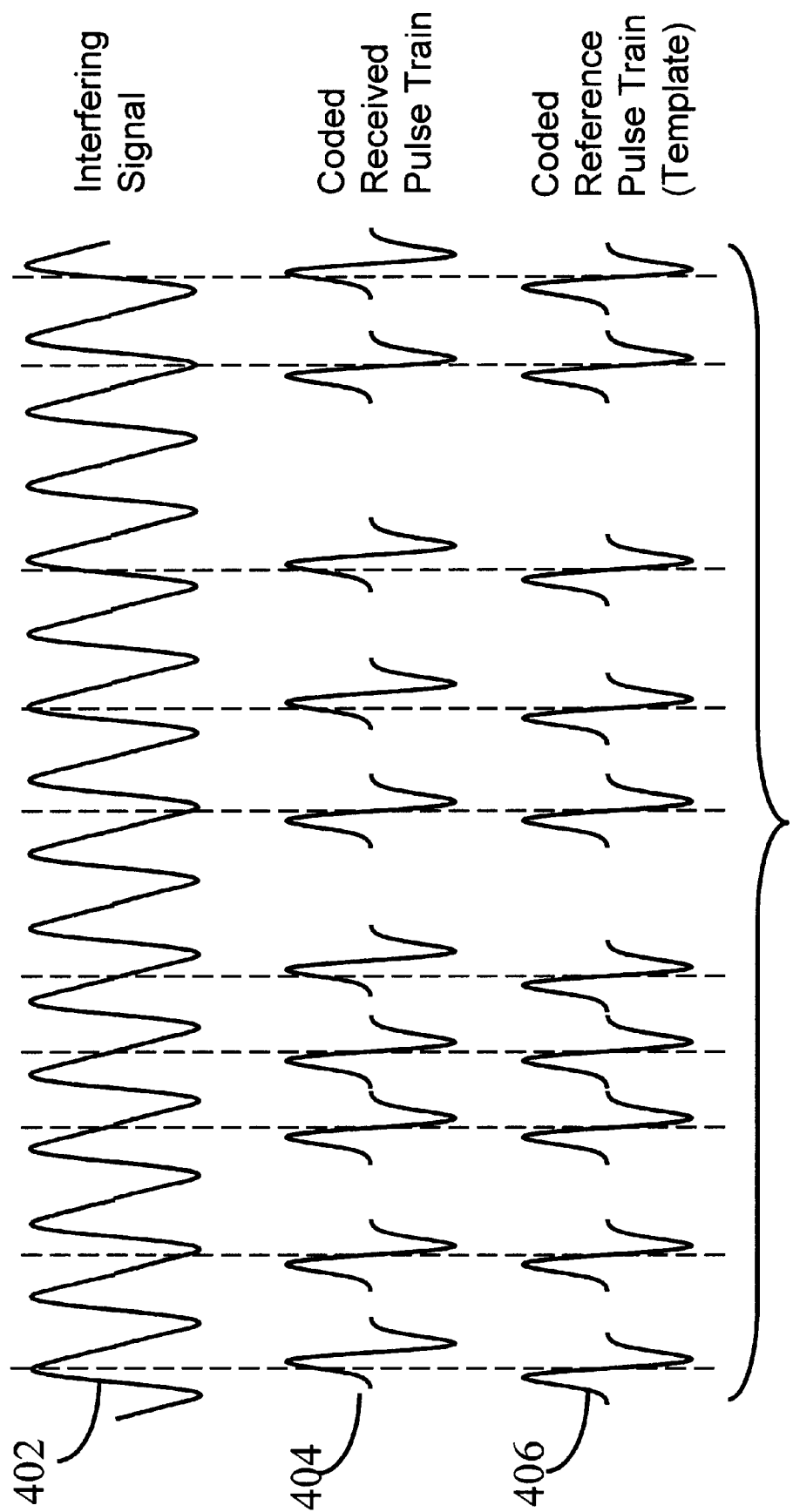
FIG. 4 illustrates a typical received signal and interference signal.

FIG. 4 illustrates the result of a narrow band sinusoidal interference signal 402 overlaying an impulse radio signal 404. At the impulse radio receiver, the input to the cross correlation would include the narrow band signal 402, as well as the received ultrawide-band impulse radio signal 404. The input is sampled by the cross correlator with a PN dithered template signal 406. Without PN coding, the cross correlation would sample the interfering signal 402 with such regularity that the interfering signals could cause significant interference to the impulse radio receiver. However, when the transmitted impulse signal is encoded with the PN code dither (and the impulse radio receiver template signal 406 is synchronized with that identical PN code dither) the correlation samples the interfering signals pseudo-randomly. The samples from the interfering signal add incoherently, increasing roughly according to square root of the number of samples integrated; whereas, the impulse radio samples add coherently, increasing directly according to the number of samples integrated. Thus, integrating over many pulses overcomes the impact of interference.

Processing Gain

Impulse radio is resistant to interference because of its large processing gain. For typical spread spectrum systems, the definition of processing gain, which quantifies the decrease in channel interference when wide-band communications are used, is the ratio of the bandwidth of the channel to the bit rate of the information signal. For example, a direct sequence spread spectrum system with a 10 kHz information bandwidth and a 10 MHz channel bandwidth yields a processing gain of 1000 or 30 dB. However, far greater processing gains are achieved with impulse radio systems, where for the same 10 kHz information bandwidth is spread across a much greater 2 GHz. channel bandwidth, the theoretical processing gain is 200,000 or 53 dB.

Capacity

It has been shown theoretically, using signal to noise arguments, that thousands of simultaneous voice channels are available to an impulse radio system as a result of the exceptional processing gain, which is due to the exceptionally wide spreading bandwidth.

For a simplistic user distribution, with N interfering users of equal power equidistant from the receiver, the total interference signal to noise ratio as a result of these other users can be described by the following equation:

$$V_{tot}^2 = \frac{N\sigma^2}{\sqrt{Z}}$$

Where $V^2_{tot}$ is the total interference signal to noise ratio variance, at the receiver;

N is the number of interfering users;

$\sigma^2$ is the signal to noise ratio variance resulting from one of the interfering signals with a single pulse cross correlation; and Z is the number of pulses over which the receiver integrates to recover the modulation.

This relationship suggests that link quality degrades gradually as the number of simultaneous users increases. It also shows the advantage of integration gain. The number of users that can be supported at the same interference level increases by the square root of the number of pulses integrated.

Multipath and Propagation

One of the striking advantages of impulse radio is its resistance to multipath fading effects. Conventional narrow band systems are subject to multipath through the Rayleigh fading process, where the signals from many delayed reflections combine at the receiver antenna according to their seemingly random relative phases. This results in possible summation or possible cancellation, depending on the specific propagation to a given location. This situation occurs where the direct path signal is weak relative to the multipath signals, which represents a major portion of the potential coverage of a radio system. In mobile systems, this results in wild signal strength fluctuations as a function of distance traveled, where the changing mix of multipath signals results in signal strength fluctuations for every few feet of travel.

Figure 5A:
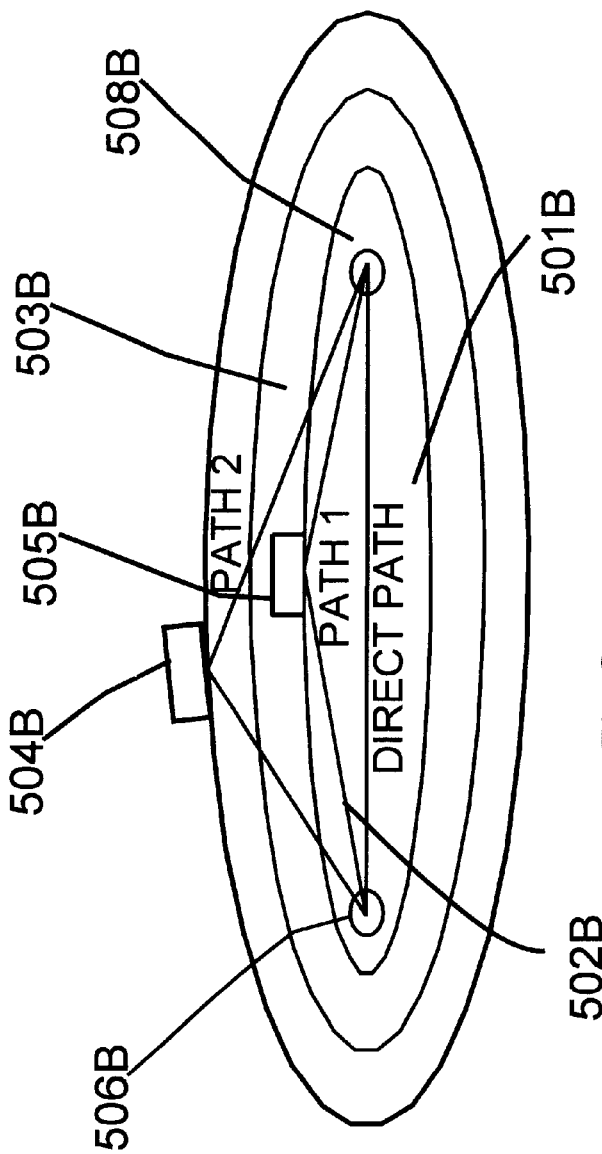
FIG. 5A illustrates a typical geometrical configuration giving rise to multipath received signals.

Impulse radios, however, can be substantially resistant to these effects. Impulses arriving from delayed multipath reflections typically arrive outside of the correlation time and thus can be ignored. This process is described in detail with reference to FIGS. 5A and 5B. In FIG. 5A, three propagation paths are shown. The direct path representing the straight line distance between the transmitter and receiver is the shortest. Path 1 represents a grazing multipath reflection, which is very close to the direct path. Path 2 represents a distant multipath reflection. Also shown are elliptical (or, in space, ellipsoidal) traces that represent other possible locations for reflections with the same time delay.

Figure 5B:
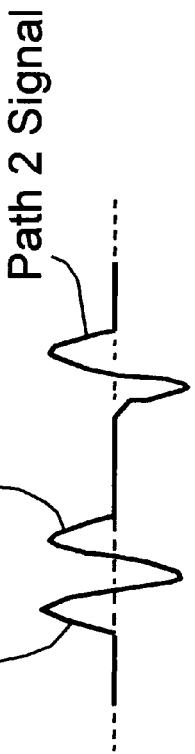
FIG. 5B illustrates exemplary multipath signals in the time domain.

FIG. 5B represents a time domain plot of the received waveform from this multipath propagation configuration. This figure comprises three doublet pulses as shown in FIG. 1A. The direct path signal is the reference signal and represents the shortest propagation time. The path 1 signal is delayed slightly and actually overlaps and enhances the signal strength at this delay value. Note that the reflected waves are reversed in polarity. The path 2 signal is delayed sufficiently that the waveform is completely separated from the direct path signal. If the correlator template signal is positioned at the direct path signal, the path 2 signal will produce no response. It can be seen that only the multipath signals resulting from very close reflectors have any effect on the reception of the direct path signal. The multipath signals delayed less than one quarter wave (one quarter wave is about 1.5 inches, or 3.5 cm at 2 GHz center frequency) are the only multipath signals that can attenuate the direct path signal. This region is equivalent to the first Fresnel zone familiar to narrow band systems designers. Impulse radio, however, has no further nulls in the higher Fresnel zones. The ability to avoid the highly variable attenuation from multipath gives impulse radio significant performance advantages.

FIG. 5A illustrates a typical multipath situation, such as in a building, where there are many reflectors 5A04, 5A05 and multiple propagation paths 5A02, 5A01. In this figure, a transmitter IX 5A06 transmits a signal which propagates along the multiple propagation paths 5A02, 5A04 to receiver RX 5A08, where the multiple reflected signals are combined at the antenna.

FIG. 5B illustrates a resulting typical received composite pulse waveform resulting from the multiple reflections and multiple propagation paths 5A01, 5A02. In this figure, the direct path signal 5A01 is shown as the first pulse signal received. The multiple reflected signals ("multipath signals", or "multipath") comprise the remaining response as illustrated.

FIGS. 5C, 5D, and 5E represent the received signal from a TM-UWB transmitter in three different multipath environments. These figures are not actual signal plots, but are hand drawn plots approximating typical signal plots. FIG. 5C illustrates the received signal in a very low multipath environment. This may occur in a building where the receiver antenna is in the middle of a room and is one meter from the transmitter. This may also represent signals received from some distance, such as 100 meters, in an open field where there are no objects to produce reflections. In this situation, the predominant pulse is the first received pulse and the multipath reflections are too weak to be significant. FIG. 5D illustrates an intermediate multipath environment. This approximates the response from one room to the next in a building. The amplitude of the direct path signal is less than in FIG. 5C and several reflected signals are of significant amplitude. (Note that the scale has been increased to normalize the plot.) FIG. 5E approximates the response in a severe multipath environment such as: propagation through many rooms; from corner to corner in a building; within a metal cargo hold of a ship; within a metal truck trailer; or within an intermodal shipping container. In this scenario, the main path signal is weaker than in FIG. 5D. (Note that the scale has been increased again to normalize the plot.) In this situation, the direct path signal power is small relative to the total signal power from the reflections.

An impulse radio receiver in accordance with the present invention can receive the signal and demodulate the information using either the direct path signal or any multipath signal peak having sufficient signal to noise ratio. Thus, the impulse radio receiver can select the strongest response from among the many arriving signals. In order for the signals to cancel and produce a null at a given location, dozens of reflections would have to be cancelled simultaneously and precisely while blocking the direct path—a highly unlikely scenario. This time separation of mulitpath signals together with time resolution and selection by the receiver permit a type of time diversity that virtually eliminates cancellation of the signal. In a multiple correlator rake receiver, performance is further improved by collecting the signal power from multiple signal peaks for additional signal to noise performance.

Where the system of FIG. 5A is a narrow band system and the delays are small relative to the data bit time, the received signal is a sum of a large number of sine waves of random amplitude and phase. In the idealized limit, the resulting envelope amplitude has been shown to follow a Rayleigh probability distribution as follows:

$$p(r) = \frac{1}{\sigma^2} \exp\left(\frac{-r^2}{2\sigma^2}\right)$$

where r is the envelope amplitude of the combined multipath signals, and $2\sigma^2$ is the RMS power of the combined mulitpath signals.

Figure 5F:
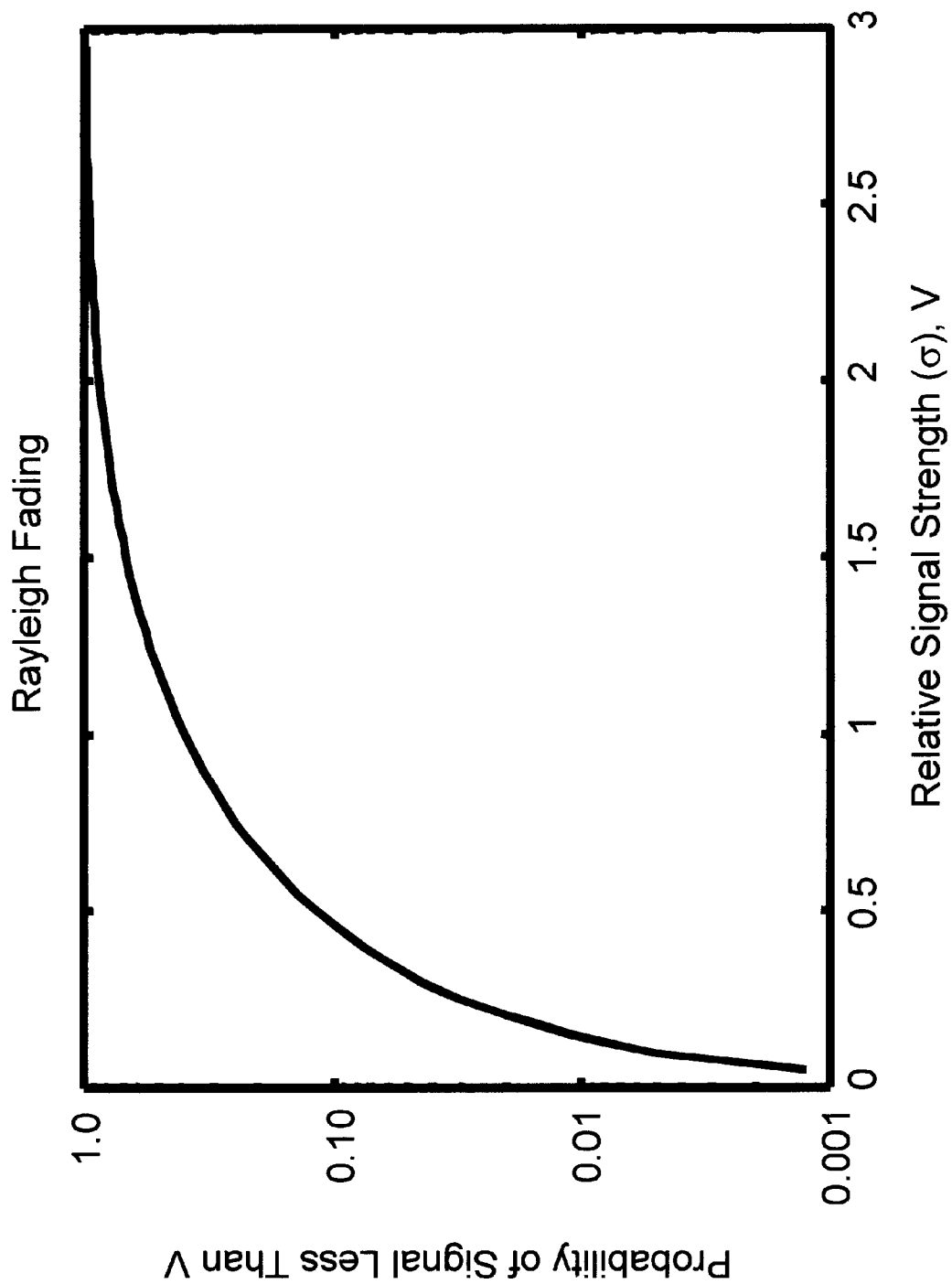
FIG. 5F illustrates the Rayleigh fading curve associated with non-impulse radio transmissions in a multipath environment.

This distribution shown in FIG. 5F. It can be seen in FIG. 5F that 10% of the time, the signal is more than 16 dB attenuated. This suggests that 16 dB fade margin is needed to provide 90% link availability. Values of fade margin from 10 to 40 dB have been suggested for various narrow band systems, depending on the required reliability. This characteristic has been the subject of much research and can be partially improved by such techniques as antenna and frequency diversity, but these techniques result in additional complexity and cost.

Figure 5G:
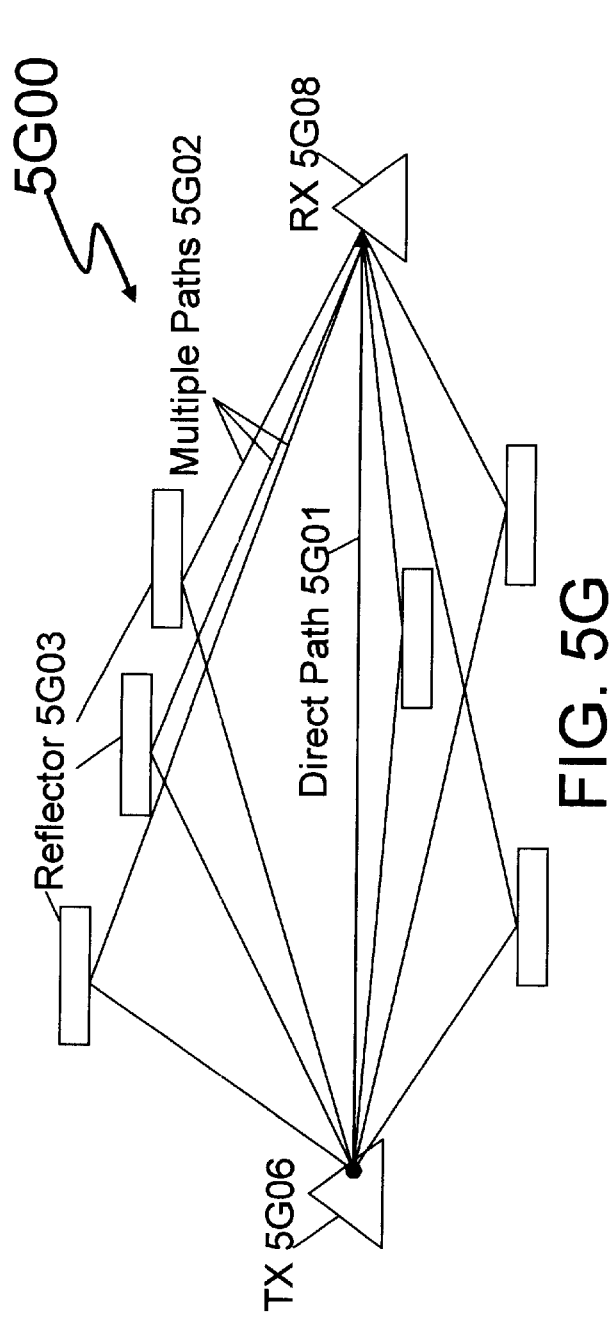
FIG. 5G illustrates a plurality of multipaths with a plurality of reflectors from a transmitter to a receiver.
Figure 5H:
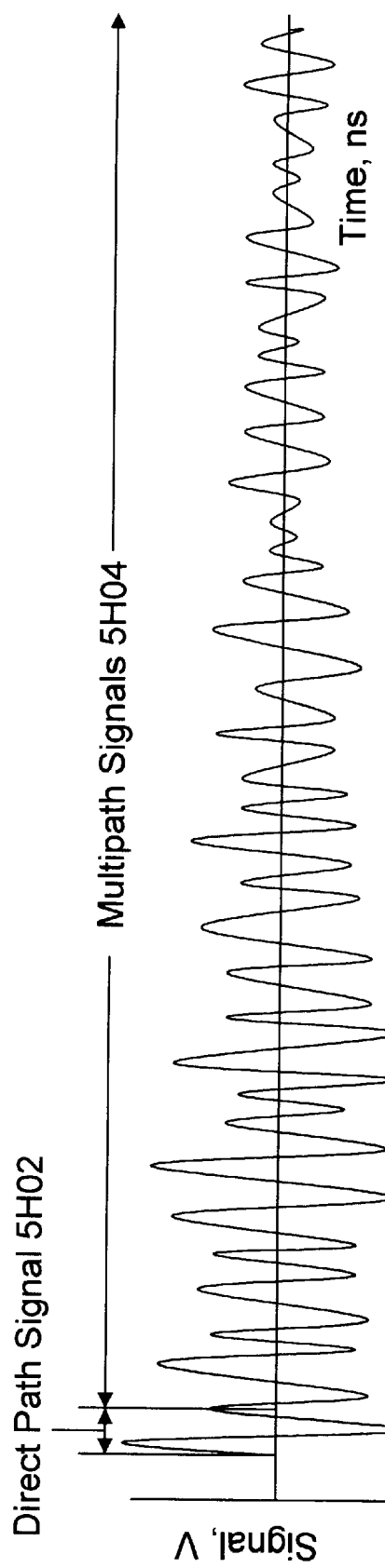
FIG. 5H graphically represents signal strength as volts vs. time in a direct path and multipath environment.

In a high multipath environment such as inside homes, offices, warehouses, automobiles, trailers, shipping containers, or outside in the urban canyon or other situations where the propagation is such that the received signal is primarily scattered energy, impulse radio, according to the present invention, can avoid the Rayleigh fading mechanism that limits performance of narrow band systems. This is illustrated in FIGS. 5G and 5H in a transmit and receive system in a high multipath environment 5G00, wherein the transmitter 5G06 transmits to receiver 5G08 with the signals reflecting off reflectors 5G03 which form multipaths 5G02. The direct path is illustrated as 5G01 with the signal graphically illustrated at 5H02 with the vertical axis being the signal strength in volts and horizontal axis representing time in nanoseconds. Multipath signals are graphically illustrated at 5H04.

Distance Measurement and Position Location

Impulse systems can measure distances to extremely fine resolution because of the absence of ambiguous cycles in the waveform. Narrow band systems, on the other hand, are limited to the modulation envelope and cannot easily distinguish precisely which RF cycle is associated with each data bit because the cycle-to-cycle amplitude differences are so small they are masked by link or system noise. Since the impulse radio waveform has no multi-cycle ambiguity, this allows positive determination of the waveform position to less than a wavelength—potentially, down to the noise floor of the system. This time position measurement can be used to measure propagation delay to determine link distance, and once link distance is known, to transfer a time reference to an equivalently high degree of precision. The inventors of the present invention have built systems that have shown the potential for centimeter distance resolution, which is equivalent to about 30 ps of time transfer resolution. See, for example, commonly owned, co-pending applications Ser. No. 09/045,929, filed Mar. 23, 1998, titled "Ultrawide-Band Position Determination System and Method", and Ser. No. 09/083,993, filed May 26, 1998, titled "System and Method for Distance Measurement by Inphase and Quadrature Signals in a Radio System", both of which are incorporated herein by reference. Finally, distance measuring and position location using impulse radio using a plurality of distance architectures is enabled in co-pending and commonly owned U.S. patent application Ser. No. 09/456,409, filed Dec. 8, 1999, titled, "System and Method for Person or Object Position Location Utilizing Impulse Radio."

Exemplary Transceiver Implementation

Transmitter

An exemplary embodiment of an impulse radio transmitter 602 of an impulse radio communication system having one subcarrier channel will now be described with reference to FIG. 6.

The transmitter 602 comprises a time base 604 that generates a periodic timing signal 606. The time base 604 typically comprises a voltage controlled oscillator (VCO), or the like, having a high timing accuracy and low jitter, on the order of picoseconds (ps). The voltage control to adjust the VCO center frequency is set at calibration to the desired center frequency used to define the transmitter's nominal pulse repetition rate. The periodic timing signal 606 is supplied to a precision timing generator 608.

The precision timing generator 608 supplies synchronizing signals 610 to the code source 612 and utilizes the code source output 614 together with an internally generated subcarrier signal (which is optional) and an information signal 616 to generate a modulated, coded timing signal 618.

The code source 612 comprises a storage device such as a random access memory (RAM), read only memory (ROM), or the like, for storing suitable PN codes and for outputting the PN codes as a code signal 614. Alternatively, maximum length shift registers or other computational means can be used to generate the PN codes.

An information source 620 supplies the information signal 616 to the precision timing generator 608. The information signal 616 can be any type of intelligence, including digital bits representing voice, data, imagery, or the like, analog signals, or complex signals.

A pulse generator 622 uses the modulated, coded timing signal 618 as a trigger to generate output pulses. The output pulses are sent to a transmit antenna 624 via a transmission line 626 coupled thereto. The output pulses are converted into propagating electromagnetic pulses by the transmit antenna 624. In the present embodiment, the electromagnetic pulses are called the emitted signal, and propagate to an impulse radio receiver 702, such as shown in FIG. 7, through a propagation medium, such as air, in a radio frequency embodiment. In a preferred embodiment, the emitted signal is wide-band or ultrawide-band, approaching a monocycle pulse as in FIG. 1A. However, the emitted signal can be spectrally modified by filtering of the pulses. This filtering will usually cause each monocycle pulse to have more zero crossings (more cycles) in the time domain. In this case, the impulse radio receiver can use a similar waveform as the template signal in the cross correlator for efficient conversion.

Receiver

An exemplary embodiment of an impulse radio receiver 702 (hereinafter called the receiver) for the impulse radio communication system is now described with reference to FIG. 7. More specifically, the system illustrated in FIG. 7 is for reception of digital data wherein one or more pulses are transmitted for each data bit.

The receiver 702 comprises a receive antenna 704 for receiving a propagated impulse radio signal 706. A received signal 708 from the receive antenna 704 is coupled to a cross correlator or sampler 710 to produce a baseband output 712. The cross correlator or sampler 710 includes multiply and integrate functions together with any necessary filters to optimize signal to noise ratio.

The receiver 702 also includes a precision timing generator 714, which receives a periodic timing signal 716 from a receiver time base 718. This time base 718 is adjustable and controllable in time, frequency, or phase, as required by the lock loop in order to lock on the received signal 708. The precision timing generator 714 provides synchronizing signals 720 to the code source 722 and receives a code control signal 724 from the code source 722. The precision timing generator 714 utilizes the periodic timing signal 716 and code control signal 724 to produce a coded timing signal 726. The template generator 728 is triggered by this coded timing signal 726 and produces a train of template signal pulses 730 ideally having waveforms substantially equivalent to each pulse of the received signal 708. The code for receiving a given signal is the same code utilized by the originating transmitter 602 to generate the propagated signal 706. Thus, the timing of the template pulse train 730 matches the timing of the received signal pulse train 708, allowing the received signal 708 to be synchronously sampled in the correlator 710. The correlator 710 ideally comprises a multiplier followed by a short term integrator to sum the multiplier product over the pulse interval. Further examples and details of correlation and sampling processes can be found in commonly owned U.S. Pat. Nos. 4,641,317, 4,743,906, 4,813,057 and 4,979,186 which are incorporated herein by reference, and commonly owned and co-pending application Ser. No. 09/356,384, filed Jul. 16, 1999, titled: "Baseband Signal Converter Device for a Wideband Impulse Radio Receiver," which is incorporated herein by reference.

The output of the correlator 710, also called a baseband signal 712, is coupled to a subcarrier demodulator 732, which demodulates the subcarrier information signal from the subcarrier. The purpose of the optional subcarrier process, when used, is to move the information signal away from DC (zero frequency) to improve immunity to low frequency noise and offsets. The output of the subcarrier demodulator 732 is then filtered or integrated in a pulse summation stage 734. The pulse summation stage produces an output representative of the sum of a number of pulse signals comprising a single data bit. The output of the pulse summation stage 734 is then compared with a nominal zero (or reference) signal output in a detector stage 738 to determine an output signal 739 representing an estimate of the original information signal 616.

The baseband signal 712 is also input to a lowpass filter 742 (also referred to as lock loop filter 742). A control loop comprising the lowpass filter 742, time base 718, precision timing generator 714, template generator 728, and correlator 710 is used to generate a filtered error signal 744. The filtered error signal 744 provides adjustments to the adjustable time base 718 to time position the periodic timing signal 726 in relation to the position of the received signal 708.

In a transceiver embodiment, substantial economy can be achieved by sharing part or all of several of the functions of the transmitter 602 and receiver 702. Some of these include the time base 718, precision timing generator 714, code source 722, antenna 704, and the like.

FIGS. 8A–8C illustrate the cross correlation process and the correlation function. FIG. 8A shows the waveform of a template signal. FIG. 8B shows the waveform of a received impulse radio signal at a set of several possible time offsets. FIG. 8C represents the output of the correlator (multiplier and short time integrator) for each of the time offsets of FIG. 8B. Thus, this graph, FIG. 8C, does not show a waveform that is a function of time, but rather a function of time-offset, i.e., for any given pulse received, there is only one corresponding point which is applicable on this graph. This is the point corresponding to the time offset of the template signal used to receive that pulse.

Further examples and details of subcarrier processes and precision timing can be found described in U.S. Pat. No. 5,677,927, titled "An Ultrawide-Band Communications System and Method", and commonly owned co-pending application Ser. No. 09/146,524, filed Sep. 3, 1998, titled "Precision Timing Generator System and Method", both of which are incorporated herein by reference.

When utilized in a network configured for location determination within a three-dimensional space, the characteristics of impulse radio significantly improve the state of the art. Location of objects and persons may be determined to very small tolerances on the order of a few inches or less. With appropriate numbers of reference apparatuses, location in three dimensions may be determined. Apparatuses for carrying out the present invention may be provided in forms that are lightweight, power efficient, robust and reliable.

DETAILED DESCRIPTION OF THE PREFERRED EMBODIMENT

Figure 9:
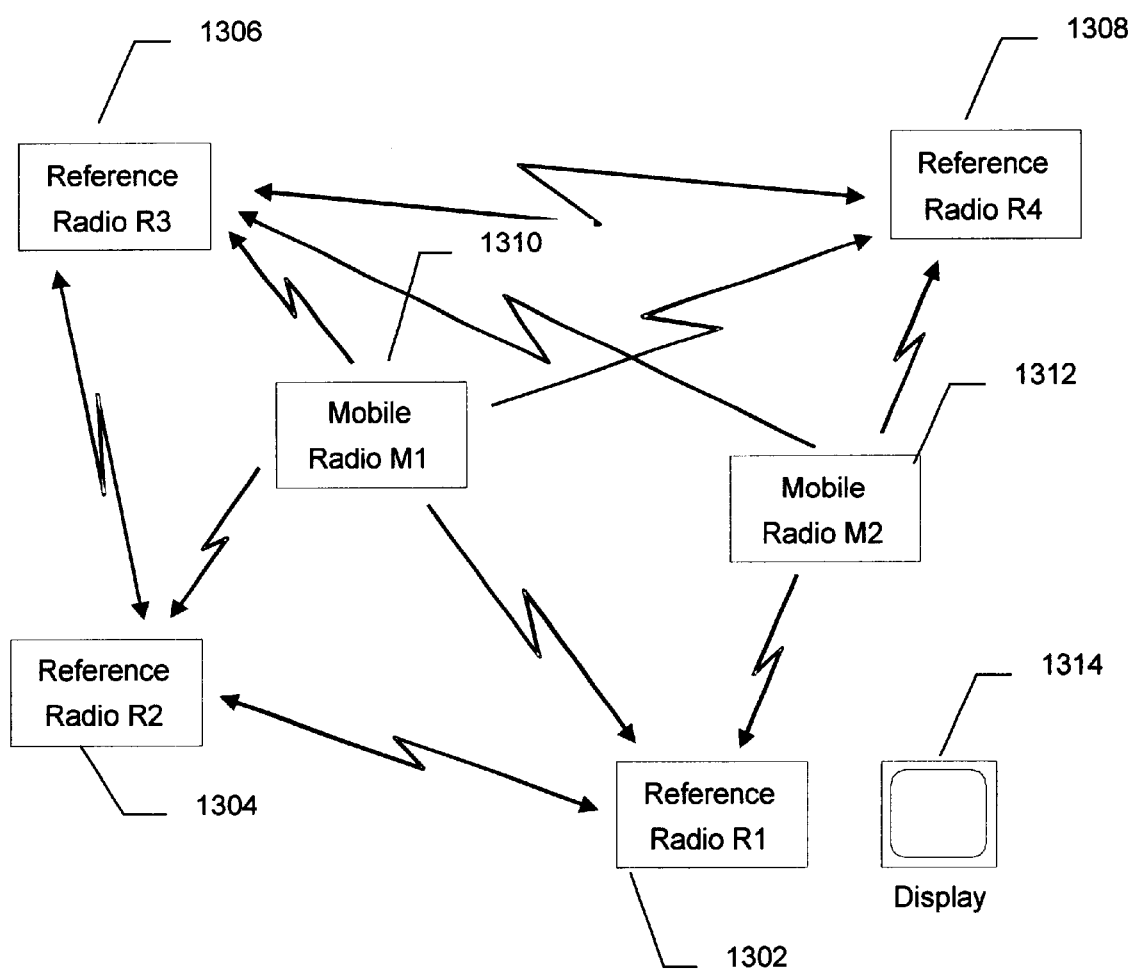
FIG. 9 is a schematic diagram of an impulse radio positioning network utilizing a synchronized transceiver tracking architecture that can be used in the present invention.

FIG. 9 is a schematic diagram of an impulse radio positioning network utilizing a synchronized transceiver tracking architecture that can be used in the present invention. In FIG. 9, an impulse radio positioning network 1300 utilizing a synchronized transceiver tracking architecture includes mobile position indicating apparatuses 1310, 1312 and reference impulse radio units 1302, 1304, 1306, 1308. A display unit 1314 may also be included in network 1300. Position indicating apparatuses 1310, 1312 and reference impulse radio units 1302, 1304, 1306, 1308 are preferably two-way transceivers. Network 1300 is designed to be scaleable, allowing from very few position indicting apparatuses 1310, 1312 and reference impulse radio units 1302, 1304, 1306, 1308 to a significantly large number. The arrows arrayed between among position indicating apparatuses 1310, 1312 and reference impulse radio units 1302, 1304, 1306, 1308 represent two-way data communication links, or voice communication links, or both data and voice communication links. A fully inter-connected network 1300 preferably has every radio (i.e., position indicating apparatuses 1310, 1312 and reference impulse radio units 1302, 1304, 1306, 1308) continually communicating with every other radio, but such continual full intercommunication links are not required. Continued full intercommunication can be selectively established when required by the needs of a particular situation.

Each position indicating apparatus 1310, 1312 and reference impulse radio units 1302, 1304, 1306, 1308 is a two-way transceiver so that each link between radios is a two-way (duplex) link. Precise ranging information (the distance between two radios) is distributed within network 1300 appropriately to allow the mobile positioning indicating determination of the precise location of mobile position indicating apparatuses 1310, 1312 in a three-dimensional coordinate system. This location information, along with other data or voice traffic, can be relayed from the mobile positioning indicating apparatuses 1310, 1312 back to one or more of reference impulse radio units 1302, 1304, 1306, 1308 or to other mobile apparatuses (not shown in FIG. 9).

Radios used in this architecture for mobile position indicating apparatuses 1310, 1312 and reference impulse radio units 1302, 1304, 1306, 1308 are impulse radio two-way transceivers. The hardware of mobile position indicating apparatus 1310, 1312 and reference impulse radio units 1302, 1304, 1306, 1308 may be essentially the same. The firmware associated with individual radios in network 1300, however, varies slightly based on the functions each respective radio is to perform. For example, when reference impulse radio unit 1302 is configured as a reference master impulse radio, reference master impulse radio 1302 directs the passing of information among radios in network 1300 and is typically responsible for collecting all the data for external graphical display at display unit 1314. Remaining reference relay impulse radio units 1304, 1306, 1308 contain a different version of the firmware. A primary difference in the respective firmware suites being the different parameters or information that each reference relay impulse radio unit 1304, 1306, 1308 must provide to network 1300. Mobile positioning indicating apparatuses 1310, 1312 have their own firmware version that may calculates their position and display it locally, if desired.

In the embodiment of the present invention illustrated in FIG. 9, each radio link is a two-way link that enables the passing of information, both data and/or voice. The datarates for each radio link are a function of several variables, including the number of pulses integrated to get a single bit, the number of bits per data parameter, the length of any headers required in the messages, the range bin size, and the number of radios in the network.

By transmitting in assigned time slots and by carefully listening to other radios transmitting in their assigned transmit time slots, all radios 1302, 1304, 1306, 1308, 1310, 1312 within network 1300 are able to synchronize themselves. Oscillators commonly used in implementing impulse radio units often drift slowly in time and may require continual monitoring and adjustment of synchronization. The accuracy of this synchronization process (timing) is dependent upon several factors including, for example, how often and how long each radio transmits.

The purpose of impulse radio positioning network 1300 is to enable the tracking of mobile positioning indicating apparatuses 1310, 1312. Tracking is accomplished by stepping through several steps. The first step is for reference impulse radio units 1302, 1304, 1306, 1308 to synchronize together and begin passing information among themselves. After the first step is complete, when a mobile position indicating apparatus 1310, 1312 enters the area covered by network 1300, the newly entering mobile position indicating apparatus 1310, 1312 is synchronized with the previously synchronized reference impulse radio units 1302, 1304, 1306, 1308. Once the mobile position indicating apparatus 1310, 1312 is synchronized, time-tagging range measurements are collected by any reference impulse radio unit 1302, 1304, 1306, 1308 with which contact is established. One or more of reference impulse radio units 1302, 1304, 1306, 1308 uses the time-tagged ranges for calculating its position in a three-dimensional coordinate system established by network 1300.

Alternatively, or additionally, a newly entering mobile position indicating apparatus 1310, 1312 may collect time-tagging range measurements from one or more reference impulse radio units 1302, 1304, 1306, 1308 with which contact is made. In the alternate configuration in which a newly entering mobile position indicating apparatus 1310, 1312 collects time-tagging information, the newly entering mobile position indicating apparatus 1310, 1312 then uses the time-tagged ranges for calculating its position in a three-dimensional coordinate system established by network 1300. Position information may be displayed at the newly entering mobile position indicating apparatus 1310, 1312.

The local coordinates designating a position within the three-dimensional coordinate system established by network 1300 can be converted to any one of several worldwide coordinate systems, such as Earth Centered Inertial (ECI), Earth Centered Earth Fixed (ECEF), or J2000 (inertial coordinates fixed to year 2000).

A final step is for either the mobile position indicating apparatus 1310, 1312 or one or more reference impulse radio unit 1302, 1304, 1306, 1308 to forward position information to display unit 1314 for storage and real-time display.

Figure 10:
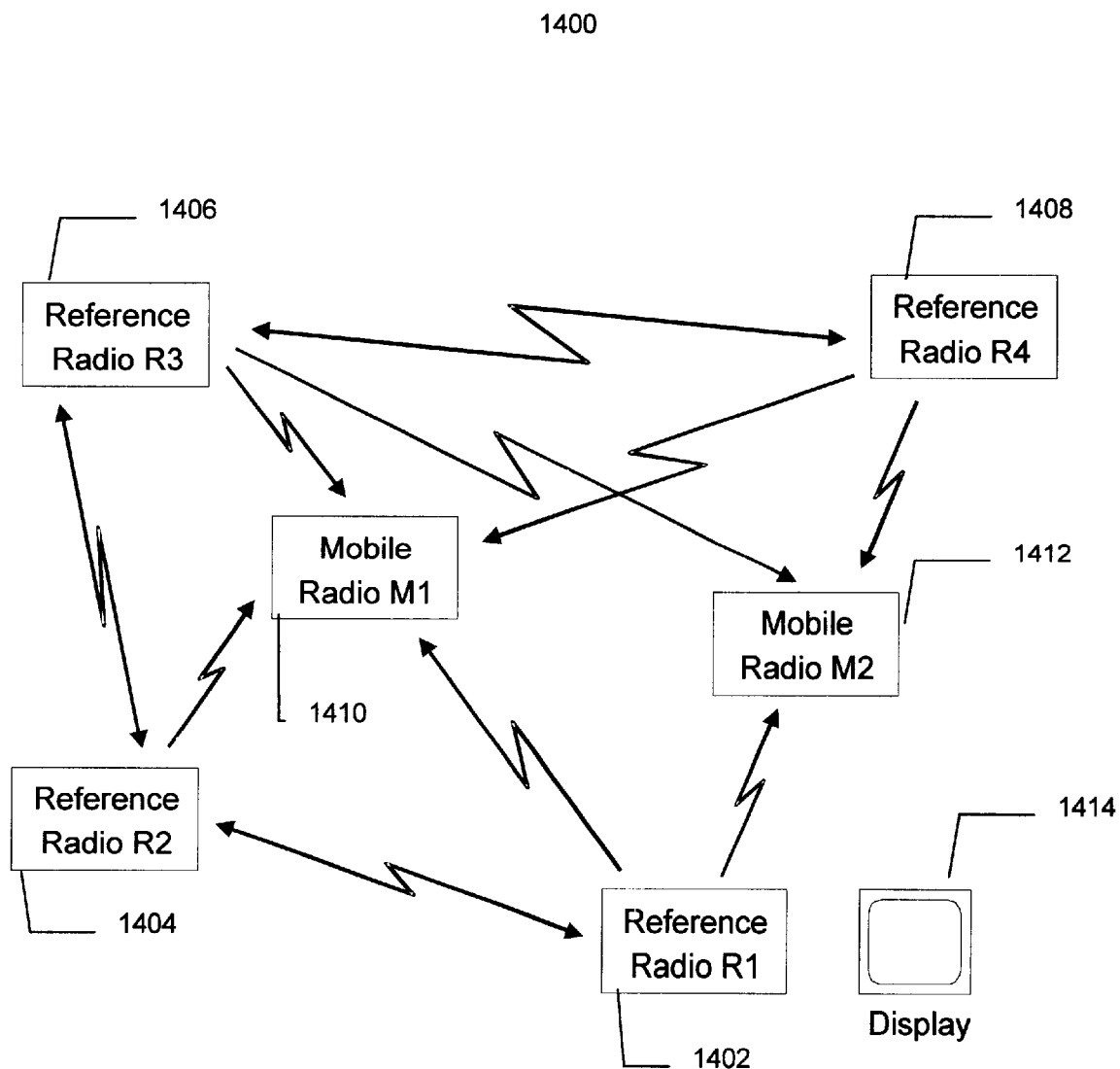
FIG. 10 is a schematic diagram of an impulse radio positioning network utilizing an unsynchronized transceiver tracking architecture that can be used in the present invention.

FIG. 10 is a schematic diagram of an impulse radio positioning network utilizing an unsynchronized transceiver tracking architecture that can be used in the present invention. In FIG. 10, an impulse radio positioning network 1400 utilizing an unsynchronized transceiver tracking architecture includes reference impulse radio units 1402, 1404, 1406, 1408 and mobile apparatuses 1410, 1412. A display unit 1414 may also be included in network 1400. The architecture of network 1400 is similar to network 1300 for effecting synchronized transceiver tracking (FIG. 9), except that the reference impulse radio units 1402, 1404, 1406, 1408 of network 1400 (FIG. 10) are not time-synchronized. Mobile apparatuses 1410, 1412 and reference impulse radio units 1402, 1404, 1406, 1408 in network 1400 are preferably full two-way (duplex) transceivers. The network is designed to be scaleable, allowing design of systems having very few mobile apparatuses 1410, 1412 and reference impulse radio units 1402, 1404, 1406, 1408 and to systems including a very large number of mobile apparatuses 1410, 1412 and reference impulse radio units 1402, 1404, 1406, 1408. The exemplary embodiment of the present invention illustrated in FIG. 10 as network 1400 has four reference impulse radio units 1402, 1404, 1406, 1408 and two mobile apparatuses 1410, 1412. The arrows between the various radios 1402, 1404, 1406, 1408, 1410, 1412 represent two-way data links, or two-way voice links, or two-way data and voice links. A fully inter-connected network 1400 would preferably have every radio 1402, 1404, 1406, 1408, 1410, 1412 continually communicating with every other radio. However, such full-time connection is not required; the duration and complexity of interconnection within network 1400 may be chosen according to the needs of a particular application.

Each radio 1402, 1404, 1406, 1408, 1410, 1412 is a two-way transceiver so that each link between radios is two-way (duplex). Precise ranging information (the distance between two respective radios) is distributed around network 1400 in a manner appropriate to allow mobile apparatuses 1410, 1412 to determine their precise three-dimensional position within a predetermined coordinate system. This position, along with other data or voice traffic, can then be relayed from mobile apparatuses 1410, 1412 back to a reference master impulse radio unit (one of reference impulse radio units 1402, 1404, 1406, 1408, say 1402) one of the other reference relay impulse radio units 1404, 1406, 1408, display unit 1414, or to other mobile apparatuses (not shown in FIG. 10).

Radios 1402, 1404, 1406, 1408, 1410, 1412 used in network 1400 are impulse radio two-way transceivers. Reference impulse radio units 1402, 1404, 1406, 1408 and mobile apparatuses 1410, 1412 are embodies in essentially the same hardware. The firmware, however, varies slightly among various radios 1402, 1404, 1406, 1408, 1410, 1412, depending on the functions each respective radio must perform. For example, reference master impulse radio unit 1402 directs the passing of information, and typically is responsible for collecting all the data for external graphical display at display unit 1414. The remaining reference relay impulse radio units 1404, 1406, 1408 contain a separate version of firmware, the primary difference from firmware employed by reference master impulse radio unit 1402 being the different parameters or information that each reference relay radio 1404, 1406, 1408 must provide for network 1400. Mobile apparatuses 1410, 1412 have their own firmware version that calculates their position within the three-dimensional space in which network 1400 is employed and displays the position locally at mobile apparatus 1410 or 1412, if desired.

In network 1400 (FIG. 10), each radio link is a two-way link that allows for the passing of information, data and voice. The data-rate for each respective radio link is a function of several variables including the number of pulses integrated to get a single bit, the number of bits per data parameter, the length of any headers required in the messages, the range bin size, and the number of radios in the network.

Unlike the radios employed in synchronized transceiver tracking architecture network 1300 (FIG. 9), reference impulse radio units 1402, 1404, 1406, 1408 in network 1400 (FIG. 10) are not time-synchronized as a network. Reference impulse radio units 1402, 1404, 1406, 1408 employed in network 1400 operate independently (free-running) and provide ranges to mobile apparatuses 1410, 1412 either periodically, randomly, or when tasked. Depending upon the application and situation, respective reference impulse radio units 1402, 1404, 1406, 1408 in network 1400 may or may not talk to other reference radios in the network.

As was the case with the architecture of network 1300 (FIG. 9), the purpose of this impulse radio positioning network 1400 is to enable the tracking of mobile apparatuses 1410, 1412. Tracking is accomplished by stepping through several steps. These steps are dependent upon the way in which the reference impulse radio units 1402, 1404, 1406, 1408 range with the mobile apparatuses 1410, 1412 (periodically, randomly, or when tasked). When a mobile apparatus 1410, 1412 enters the three-dimensional space covered by network 1400, mobile apparatus 1410, 1412 either listens for reference impulse radio units 1402, 1404, 1406, 1408 to broadcast, then responds; or mobile apparatus 1410, 1412 queries (tasks) particular reference impulse radio units 1402, 1404, 1406, 1408 to respond. When appropriate reference impulse radio units 1402, 1404, 1406, 1408 respond, mobile apparatus 1410 or 1412 begins collecting and time-tagging range measurements from reference impulse radio units 1402, 1404, 1406, 1408 (or other mobile radios). Mobile apparatus 1410 or 1412 then takes the time-tagged ranges and, using an estimator algorithm (e.g. a least squares-based or similar estimator), calculates its own position (of the mobile apparatus 1410 or 1412) in predetermined coordinates. The predetermined coordinates may be locally determined. If the situation warrants and the conversion possible, the local coordinates can be converted to any one of the worldwide coordinates such as Earth Centered Inertial (ECI), Earth Centered Earth Fixed (ECEF), or J2000 (inertial coordinates fixed to year 2000). Global Positioning System (GPS) may be employed as well. Mobile apparatus 1410 or 1412 may also forward its position information to display unit 1414 for storage and real-time display.

Figure 11:
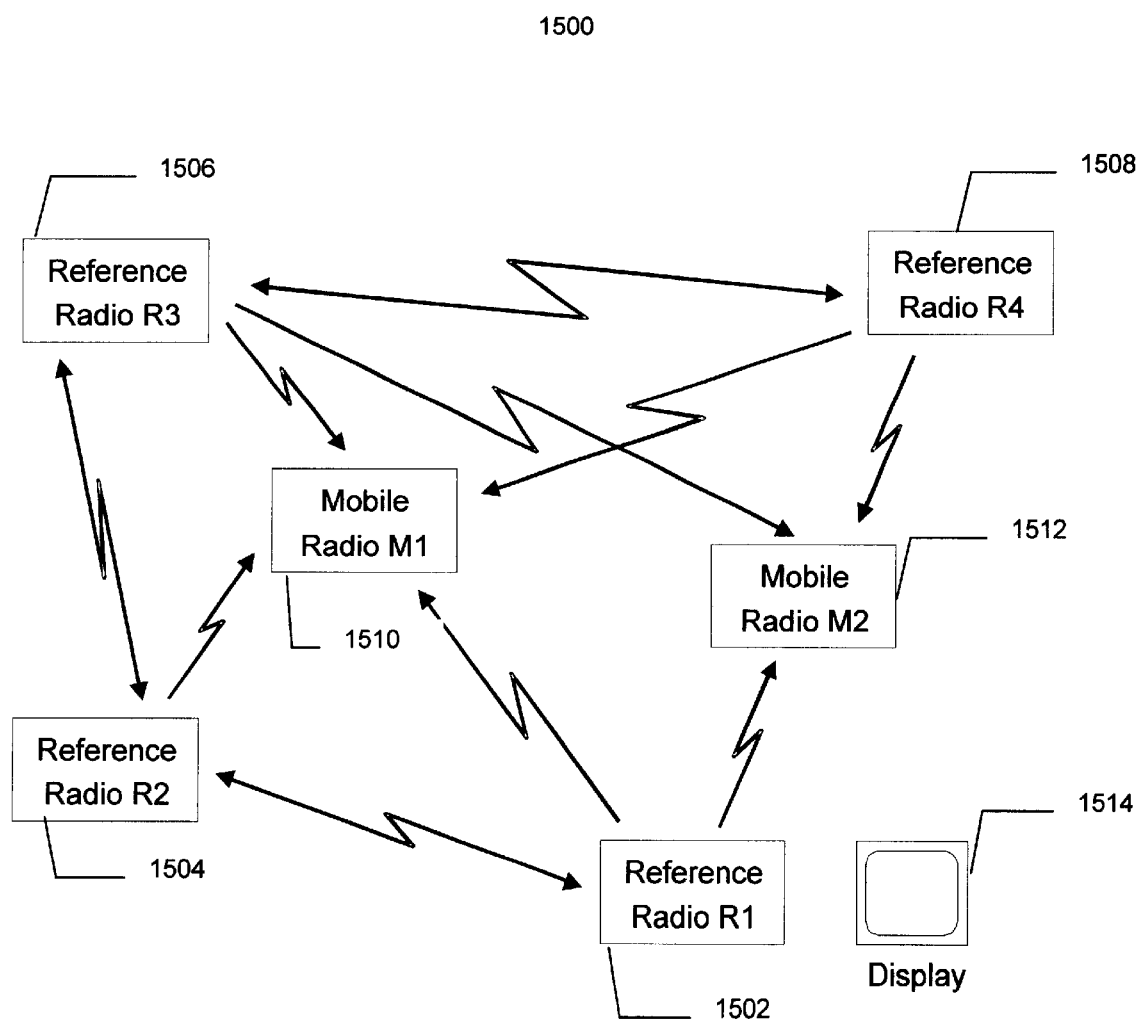
FIG. 11 is a schematic diagram of an impulse radio positioning network utilizing a synchronized transmitter tracking architecture that can be used in the present invention.

FIG. 11 is a schematic diagram of an impulse radio positioning network utilizing a synchronized transmitter tracking architecture that can be used in the present invention. In FIG. 11, an impulse radio positioning network 1500 includes reference impulse radio units 1502, 1504, 1506, 1508 and mobile apparatuses 1510, 1512 in a synchronized transmitter tracking architecture. A display unit 1514 may also be included in network 1500. The architecture of network 1500 is perhaps the simplest of the impulse radio positioning architectures, from the point-of-view of mobile apparatuses 1510, 1512. This is so because mobile apparatuses 1510, 1512 simply transmit in a free-running sense in network 1500. Network 1500 is designed to be scaleable, allowing from very few mobile apparatuses 1510, 1512 and reference impulse radio units 1502, 1504, 1506, 1508 to a very large number of mobile apparatuses 1510, 1512 and reference impulse radio units 1502, 1504, 1506, 1508. The architecture embodied in network 1500 is especially applicable to an "RF tag" (radio frequency tag) type of application.

The particular example of synchronized transmitter tracking architecture illustrated in FIG. 11 is embodied in a network 1500 that includes four reference impulse radio units radios 1502, 1504, 1506, 1508 and two mobile apparatuses 1510, 1512. The arrows between radios 1502, 1504, 1506, 1508, 1510, 1512 represent two-way and one-way data links, voice links, or data and voice links. In the embodiment of the present invention illustrated in network 1500 mobile apparatuses 1510, 1512 only transmit. Mobile apparatuses 1510, 1512 do not receive transmissions from reference impulse radio units 1502, 1504, 1506, 1508.

Each reference impulse radio unit 1502, 1504, 1506, 1508 is a two-way transceiver so that each link between reference impulse radio units 1502, 1504, 1506, 1508 is a two-way (duplex) link. Precise ranging information (the distance between two respective radios) is distributed around network 1500 to facilitate synchronization of reference impulse radio units 1502, 1504, 1506, 1508 to receive transmissions from mobile apparatuses 1510, 1512 and then determine the three-dimensional position of mobile apparatuses 1510, 1512 within the three-dimensional space covered by network 1500. Position information, along with other data or voice traffic, can be relayed among a reference master impulse radio unit (e.g., reference impulse radio unit 1502), other reference impulse radio units 1504, 1506, 1508 and display unit 1514.

Reference impulse radio units 1502, 1504, 1506, 1508 used in this architecture (network 1500) are impulse radio two-way transceivers; mobile apparatuses 1510, 1512 are one-way impulse radio transmitters. Firmware in radios 1502, 1504, 1506, 1508, 1510, 1512 varies slightly based on the functions each respective radio must perform. For example, reference master impulse radio unit 1502 is designated to direct the passing of information, and is typically responsible for collecting all data for external graphical display at display unit 1514. The remaining reference impulse radio units 1504, 1506, 1508 contain a separate version of the firmware; the primary difference from firmware used in reference master impulse radio unit 1502 being the different parameters or information that remaining reference impulse radio units 1504, 1506, 1508 must provide for network 1500. Mobile apparatuses 1510, 1512 have their own firmware version that transmits pulses in predetermined sequences.

Each radio link among reference impulse radio units 1502, 1504, 1506, 1508 is a two-way link that allows for the passing of data and voice information. The data-rate in each radio link is a function of several variables including the number of pulses integrated to get a single bit, the number of bits per data parameter, the length of any headers required in the messages, the range bin size, and the number of radios in the network.

By transmitting each respective reference impulse radio unit 1502, 1504, 1506, 1508 in a respective assigned time slot, and by listening to the other reference impulse radio units transmit in their respective assigned transmit time slots, the entire group of reference impulse radio units 1502, 1504, 1506, 1508 within network 1500 may synchronize among themselves. Oscillators typically used in impulse radio units 1502, 1504, 1506, 1508 drift slowly in time and may require monitoring and adjustment to maintain desired synchronization. The accuracy of such a synchronization process (timing) is dependent upon several factors including, for example, how often and how long each radio transmits, along with other factors. Because mobile apparatuses 1510, 1512 are transmit-only transmitters, they are not time-synchronized with the synchronized reference impulse radio 1502, 1504, 1506, 1508.

The purpose of impulse radio positioning network 1500 is to facilitate tracking of mobile apparatuses 1510, 1512. Tracking is accomplished by stepping through several well-defined steps. The first step is for reference impulse radio units 1502, 1504, 1506, 1508 to synchronize together and begin passing information. Then, when a mobile apparatus 1510, 1512 enters the space covered by network 1500 and begins to transmit pulses, reference impulse radio units 1502, 1504, 1506, 1508 detect the pulses as time-of-arrivals (TOAs). Multiple TOAs collected by different synchronized reference impulse radio units 1502, 1504, 1506, 1508 are converted to ranges, which are then used to calculate the XYZ (i.e., three-dimensional) position of mobile apparatus 1510, 1512 in coordinates. Coordinates may be locally generated coordinates, or they may be more widely accepted coordinates, such a coordinates relating to the Global Positioning System (GPS). If the situation warrants and the conversion possible, the coordinates can be expressed as any one of the worldwide coordinates, such as Earth Centered Inertial (ECI), Earth Centered Earth Fixed (ECEF), or J2000 (inertial coordinates fixed to year 2000). Finally, reference impulse radio units 1502, 1504, 1506, 1508 forward their position calculations to display unit 1514 for storage and real-time display.

Figure 12:
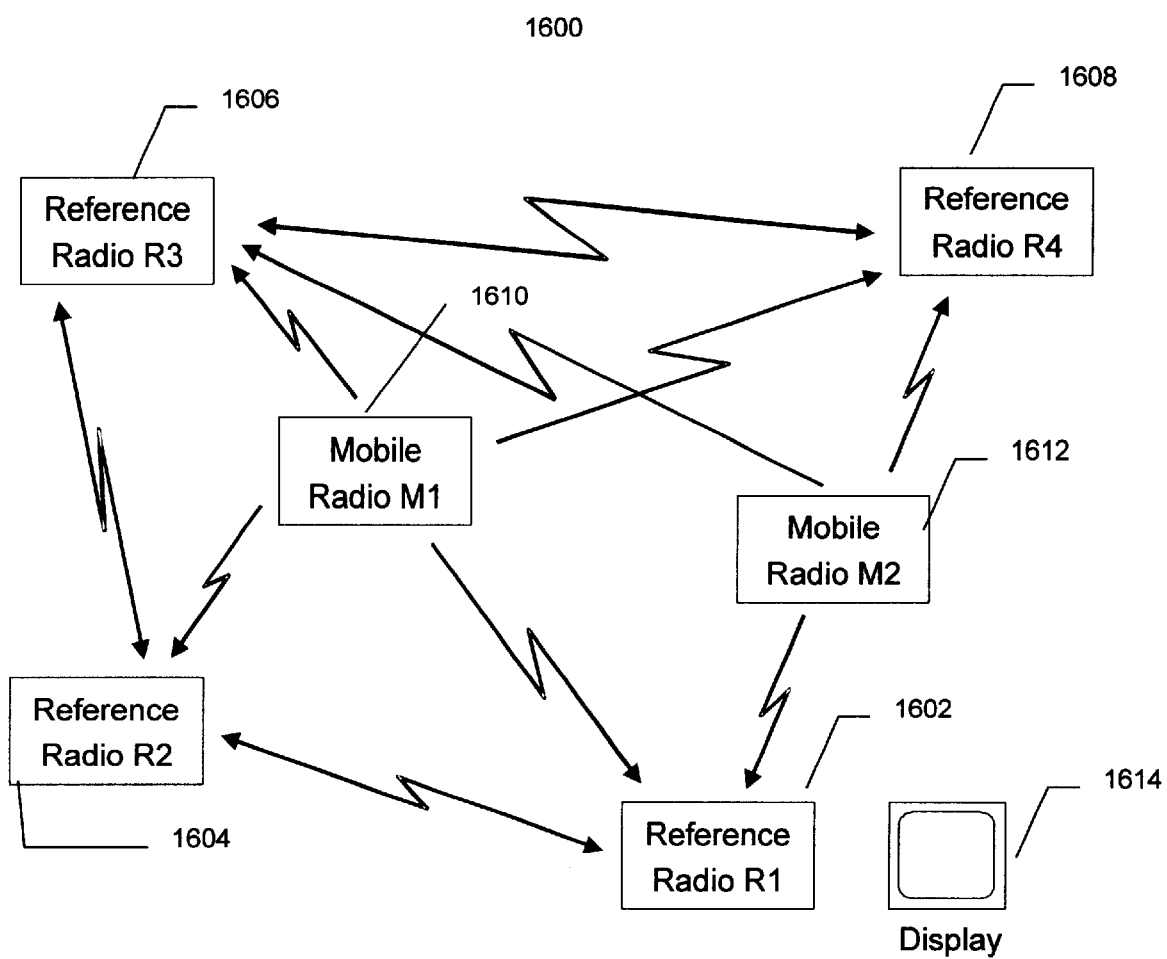
FIG. 12 is a schematic diagram of an impulse radio positioning network utilizing an unsynchronized transmitter tracking architecture that can be used in the present invention.

FIG. 12 is a schematic diagram of an impulse radio positioning network utilizing an unsynchronized transmitter tracking architecture that can be used in the present invention. In FIG. 12, an impulse radio positioning network 1600 includes reference impulse radio units 1602, 1604, 1606, 1608 and mobile apparatuses 1610, 1612 for establishing an unsynchronized transmitter tracking architecture. The architecture of network 1600 is similar to the synchronized transmitter tracking architecture of network 1500 (FIG. 1) except that reference impulse radio units 1602, 1604, 1606, 1608 are not synchronized in time. That is, reference impulse radio units 1602, 1604, 1606, 1608 and mobile apparatuses 1610, 1612 are free-running. Network 1600 is designed to be scaleable, allowing from few mobile apparatuses 1610, 1612 and reference impulse radio units 1602, 1604, 1606, 1608 to a large number of mobile apparatuses 1610, 1612 and reference impulse radio units 1602, 1604, 1606, 1608. The architecture of network 1600 is especially applicable to an "RF tag" (radio frequency tag) type of application.

The particular example of the unsynchronized transmitter tracking architecture embodied in network 1600 (FIG. 12) includes reference impulse radio units 1602, 1604, 1606, 1608 and mobile apparatuses 1610, 1612. The arrows between the various radios 1602, 1604, 1606, 1608, 1610, 1612 represent two-way and one-way data links, voice links, or data and voice links. Mobile apparatuses 1610, 1612 only transmit; mobile apparatuses 1610, 1612 do not receive transmissions from reference impulse radio units 1602, 1604, 1606, 1608. Unlike the synchronous transmitter tracking architecture of network 1500 (FIG. 11), reference impulse radio units 1602, 1604, 1606, 1608 in network 1600 (FIG. 12) are free-running (unsynchronized). There are several ways to implement this design, the most common involves relaying time-of-arrival (TOA) pulses from the mobile apparatuses 1610, 1612 and reference impulse radio units 1602, 1604, 1606, 1608, as received at the reference impulse radio units 1602, 1604, 1606, 1608, back to a reference master impulse radio unit (e.g., reference impulse radio unit 1602). Reference master impulse radio unit 1602 communicates with display unit 1614.

In the architecture of network 1600 (FIG. 12), each reference impulse radio unit 1602, 1604, 1606, 1608 is a two-way impulse radio transceiver; thus each link between respective reference impulse radio units 1602, 1604, 1606, 1608 can be either two-way (duplex) or one-way (simplex). TOA information is typically transmitted from the reference impulse radio units 1602, 1604, 1606, 1608 back to a reference master impulse radio unit (e.g., reference impulse radio unit 1602) where the TOAs are converted to ranges and then an XYZ position of mobile apparatus 1610 or 1612. Position information may also be forwarded and displayed at display unit 1614.

Reference impulse radio units 1602, 1604, 1606, 1608 used in network 1600 are impulse radio two-way transceivers; mobile apparatuses 1610, 1612 are one-way impulse radio transmitters. Firmware in the various radios 1602, 1604, 1606, 1608, 1610, 1612 varies based on the functions each respective radio must perform. For example, reference master impulse radio 1602 collects the TOA information, and is typically responsible for forwarding tracking data to display unit 1614. The remaining reference relay impulse radio units 1604, 1606, 1608 contain a separate version of firmware; the primary difference from firmware used with reference master impulse radio 1602 being the different parameters or information that each reference relay impulse radio unit 1604, 1606, 1608 must provide for network 1600. Mobile apparatuses 1610, 1612 have their own firmware version that transmits pulses in predetermined sequences.

Each reference radio link is a two-way link that allows for the passing of data and voice information. The data-rate for each radio link is a function of several variables including the number of pulses integrated to get a single bit, the number of bits per data parameter, the length of any headers required in the messages, the range bin size, and the number of radios in the network.

Since reference impulse radio units 1602, 1604, 1606, 1608 and mobile apparatuses 1610, 1612 are free-running, synchronization is carried out by reference master impulse radio unit 1602. Oscillators typically used in impulse radios drift slowly in time; they may require monitoring and adjustment to maintain synchronization at reference master impulse radio unit 1602. The accuracy of synchronization (timing) is dependent upon several factors including, for example, how often and how long each radio transmits, along with other factors.

The purpose of impulse radio positioning network 1600 is to facilitate tracking of mobile apparatuses 1610, 1612.

Tracking is accomplished by stepping through several steps. The method provides that each reference impulse radio unit 1602, 1604, 1606, 1608 periodically (randomly) transmits a pulse sequence. When a mobile apparatus 1610 or 1612 enters the space covered by network 1600 and begins to transmit pulses, reference impulse radio units 1602, 1604, 1606, 1608 receive the pulses transmitted by a mobile apparatus 1610 or 1612 as time-of-arrivals (TOAs). Each reference impulse radio unit 1602, 1604, 1606, 1608 also receives pulses (TOAs) transmitted by other reference impulse radio units 1602, 1604, 1606, 1608. TOAs can be relayed back to a reference master impulse radio unit (e.g., reference impulse radio reference master impulse radio unit 1602 then converts TOAs to ranges, which are then used to calculate the XYZ position of mobile apparatus 1610 or 1612. If the situation warrants and the conversion possible, the XYZ position can be converted to any one of the worldwide coordinates such as Earth Centered Inertial (ECI), Earth Centered Earth Fixed (ECEF), or J2000 (inertial coordinates fixed to year 2000). Global Positioning System (GPS) coordinates may also be used to express positions of mobile apparatuses 1610, 1612. Finally, reference master impulse radio unit 1602 forwards its position calculation to display unit 1614 for storage and real-time display.

Figure 13:
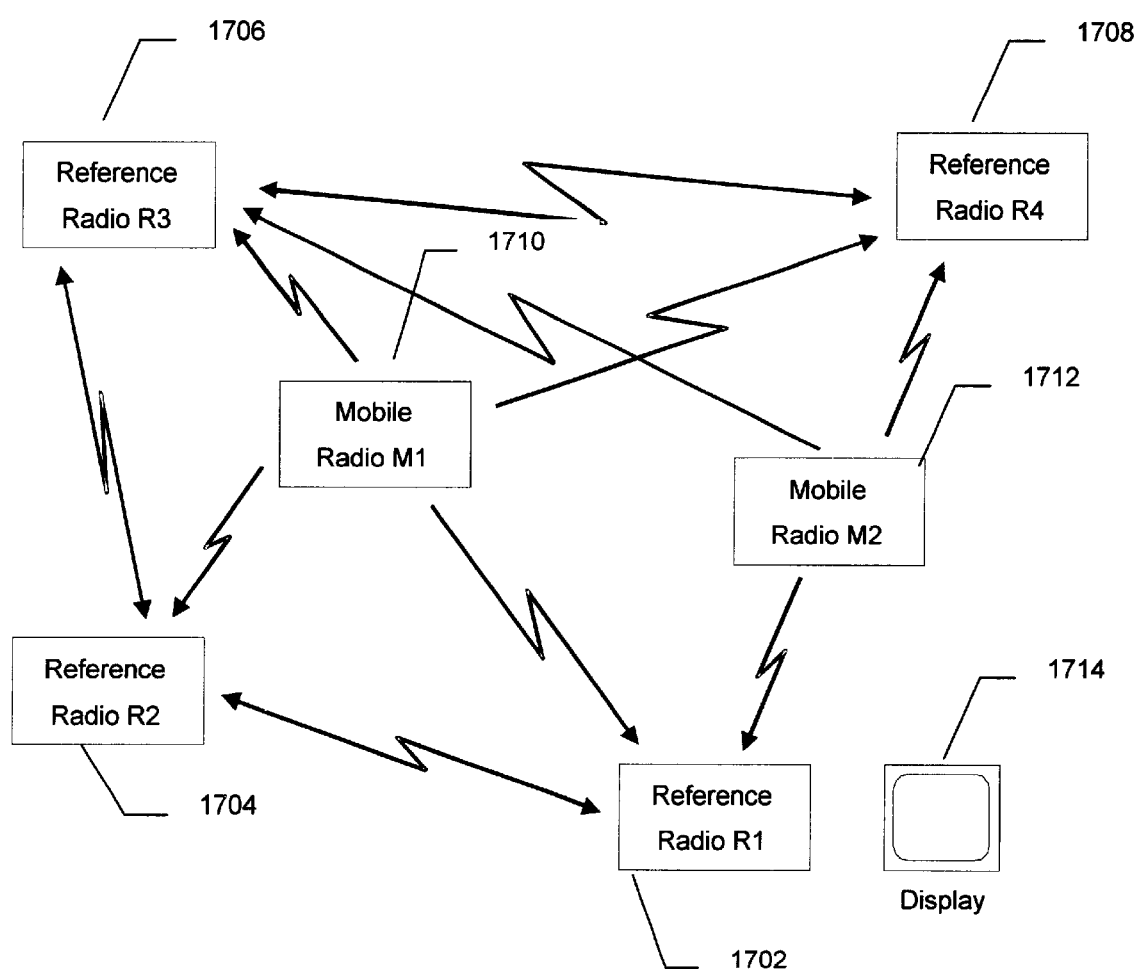
FIG. 13 is a schematic diagram of an impulse radio positioning network utilizing a synchronized receiver tracking architecture that can be used in the present invention.

FIG. 13 is a schematic diagram of an impulse radio positioning network utilizing a synchronized receiver tracking architecture that can be used in the present invention. In FIG. 13, an impulse radio positioning network 1700 includes reference impulse radio units 1702, 1704, 1706, 1708 and mobile apparatuses 1710, 1712. A display unit 1714 may also be included in network 1700. Network 1700 is different from synchronized transmitter tracking architecture network 1500 (FIG. 11) in that in network 1700 mobile apparatuses 1710, 1712 determine their positions but are not able to broadcast position information to another station because mobile apparatuses 1710, 1712 are receive-only radios. Network 1700 is designed to be scaleable, allowing from few mobile apparatuses 1710, 1712 and reference impulse radio units 1702, 1704, 1706, 1708 to a large number of mobile apparatuses 1710, 1712 and reference impulse radio units 1702, 1704, 1706, 1708.

This particular example of the synchronized receiver tracking architecture shows network 1700 including reference impulse radio units 1702, 1704, 1706, 1708 and mobile apparatuses 1710, 1712. The arrows between the various radios represent two-way and one-way data links, voice links, or data and voice links. Mobile apparatuses 1710, 1712 receive transmissions from other radios, and do not transmit.

Each reference impulse radio unit 1702, 1704, 1706, 1708 is a two-way transceiver, and each mobile apparatus 1710, 1712 is a receive-only radio. Precise, synchronized pulses are transmitted within network 1700 and received by reference impulse radio units 1702, 1704, 1706, 1708 and mobile apparatuses 1710, 1712. Mobile apparatuses 1710, 1712 receive times-of-arrival (TOA) pulses, convert TOAs to ranges, then determine their XYZ positions. Since mobile apparatuses 1710, 1712 do not transmit, only they themselves know their XYZ positions.

Reference impulse radio units 1702, 1704, 1706, 1708 employed in network 1700 are impulse radio two-way transceivers; mobile apparatuses 1710, 1712 are receive-only radios. Firmware for the various radios 1702, 1704, 1706, 1708, 1710, 1712 varies slightly based on the functions each respective radio must perform. For example, a reference master impulse radio unit (e.g., reference impulse radio unit 1702) is designated to direct the synchronization of network 1700. The remaining reference impulse radio units 1704, 1706, 1708 contain a different version of the firmware, the primary difference from firmware used by reference master impulse radio unit 1702 being the different parameters or information that each reference impulse radio unit 1704, 1706, 1708 must provide for network 1700. Mobile apparatuses 1710, 1712 have their own fineware version that calculates their position and displays that own position information locally at a respective mobile apparatus 1710, 1712 if desired.

Each reference radio link among reference impulse radio units 1702, 1704, 1706, 1708 is a two-way link that allows for the passing of data and voice information. Mobile apparatuses 1710, 1712 are receive-only. The data-rate for each radio link is a function of several variables including the number of pulses integrated to get a single bit, the number of bits per data parameter, the length of any headers required in the messages, the range bin size, and the number of radios in the network.

By transmitting reference impulse radio units 1702, 1704, 1706, 1708 in assigned time slots, and by carefully listening to the other reference impulse radio units 1702, 1704, 1706, 1708 transmit in their assigned transmit time slots, the entire group of reference impulse radio units reference impulse radio units 1702, 1704, 1706, 1708 within network 1700 are able to synchronize themselves. Oscillators typically used with impulse radios may drift slowly in time; they may require monitoring and adjustment to maintain synchronization. The accuracy of this synchronization (timing) is dependent upon several factors including, for example, how often and how long each radio transmits along with other factors.

The purpose of impulse radio positioning network 1700 is to facilitate the tracking of mobile apparatuses 1710, 1712. Tracking is accomplished by stepping through several well-defined steps. The first step is for the reference impulse radio units 1702, 1704, 1706, 1708 to synchronize together and begin passing information. When a mobile apparatus 1710 or 1712 enters the space covered by network 1700, mobile apparatus 1710 or 1712 begins receiving the time-of-arrival (TOA) pulses from the reference radio network (i.e., reference impulse radio units 1702, 1704, 1706, 1708). The TOA pulses are converted to ranges, then the ranges are used to determine the XYZ position of mobile apparatus 1710 or 1712 in coordinates using an estimator algorithm, such as a least squares-based estimator. If the situation warrants and the conversion possible, the coordinates can be converted to any one of the worldwide coordinates such as Earth Centered Inertial (ECI), Earth Centered Earth Fixed (ECEF), or J2000 (inertial coordinates fixed to year 2000). Global Positioning System (GPS) coordinates may also be used to express positions of mobile apparatuses 1710, 1712.

Figure 14:
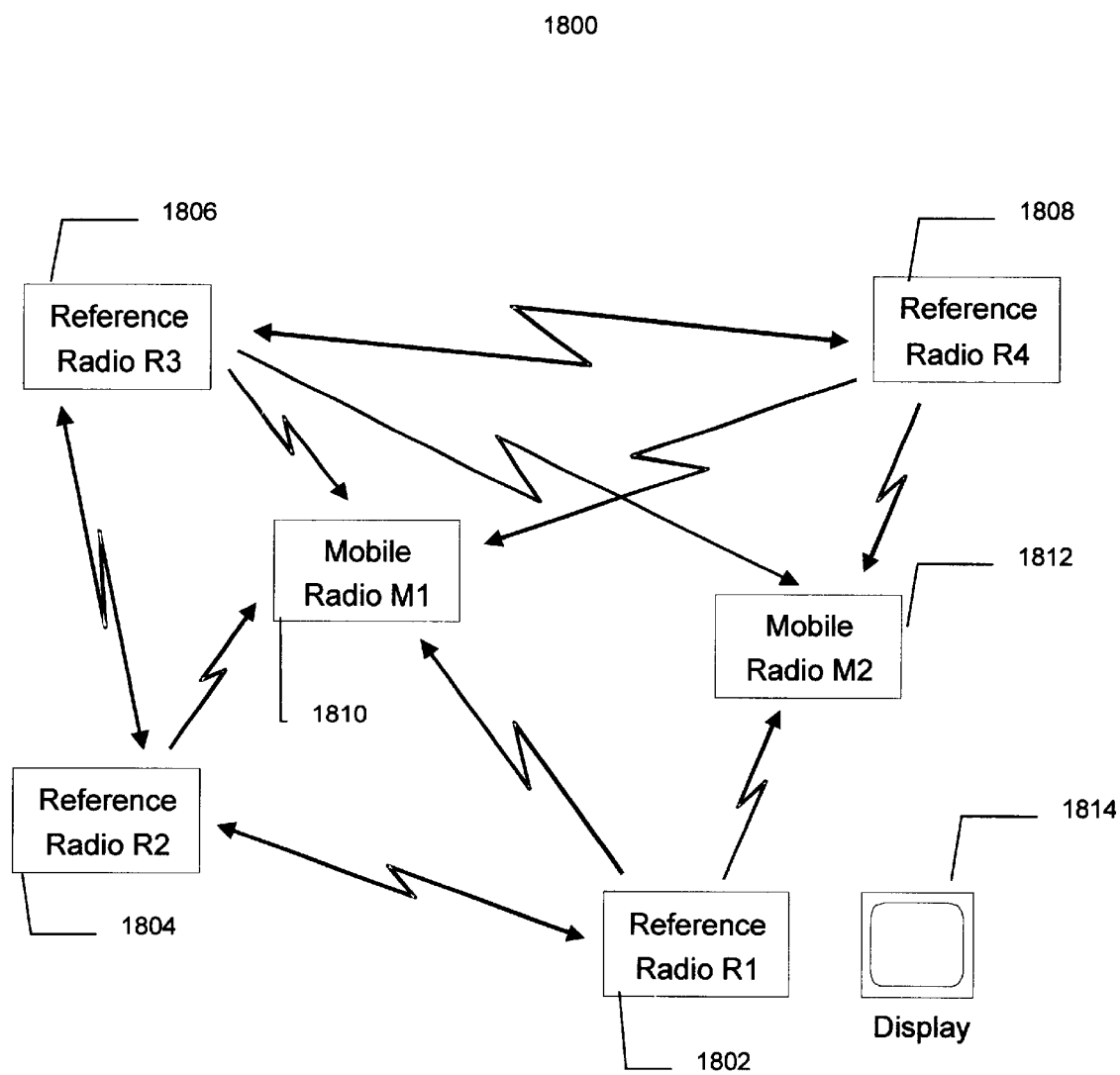
FIG. 14 is a schematic diagram of an impulse radio positioning network utilizing an unsynchronized receiver tracking architecture that can be used in the present invention.

FIG. 14 is a schematic diagram of an impulse radio positioning network utilizing an unsynchronized receiver tracking architecture that can be used in the present invention. In FIG. 14, an impulse radio positioning network 1800 includes reference impulse radio units 1802, 1804, 1806, 1808 and mobile apparatuses 1810, 1812. Network 1800 is different from the synchronized receiver tracking architecture of network 1500 (FIG. 11) because in network 1800 reference impulse radio units 1802, 1804, 1806, 1808 are not time-synchronized. Mobile apparatuses 1810, 1812 determine their own positions but cannot broadcast information to any other station because mobile apparatuses 1810, 1812 are receive-only radios. Network 1800 is designed to be scaleable, allowing from few mobile apparatuses 1810, 1812 and reference impulse radio units 1802, 1804, 1806, 1808 to a large number of mobile apparatuses 1810, 1812 and reference impulse radio units 1802, 1804, 1806, 1808. The arrows between the various radios 1802, 1804, 1806, 1808, 1810, 1812 represent two-way and one-way data links, voice links, or data and voice links. Mobile apparatuses 1810, 1812 only receive transmissions from other radios, and do not transmit.

Each reference impulse radio unit 1802, 1804, 1806, 1808 is an impulse radio two-way transceiver; each mobile apparatus 1810, 1812 is a receive-only impulse radio. Precise, unsynchronized pulses are transmitted by the reference network (i.e., reference impulse radio units 1802, 1804, 1806, 1808). Those pulses are received by the other reference impulse radio units 1802, 1804, 1806, 1808 and mobile apparatuses 1810, 1812. Mobile apparatuses 1810, 1812 take times-of-arrival (TOA) pulses, convert them to ranges, and then determine their own XYZ positions. Since the mobile apparatuses 1810, 1812 do not transmit, only they themselves know their XYZ positions.

Reference impulse radio units 1802, 1804, 1806, 1808 used in network 1800 are impulse radio two-way transceivers; mobile apparatuses 1810, 1812 are receive-only radios. Firmware for the various radios 1802, 1804, 1806, 1808, 1810, 1812 varies based on the functions each respective radio must perform. In network 1800, a reference master impulse radio unit (e.g., reference impulse radio unit 1802) may be used to provide some synchronization information to mobile apparatuses 1810, 1812. Mobile apparatuses 1810, 1812 know the respective XYZ position for each reference impulse radio unit 1802, 1804, 1806, 1808 so that mobile apparatuses 1810, 1812 may do all necessary synchronization internally.

The data-rate for each radio link is a function of several variables including the number of pulses integrated to get a single bit, the number of bits per data parameter, the length of any headers required in the messages, the range bin size, and the number of impulse radios in the network.

For network 1800, reference impulse radio units 1802, 1804, 1806, 1808 transmit in a free-running (unsynchronized) manner. Oscillators typically used in impulse radios may drift slowly in time; they may require monitoring and adjustment of synchronization by reference master impulse radio unit 1802 or the mobile apparatuses 1810, 1812 (whomever is doing the synchronization). The accuracy of this synchronization (timing) is dependent upon several factors including, for example, how often and how long each radio transmits.

The purpose of impulse radio positioning network 1800 is to facilitate tracking mobile apparatuses 1810, 1812. Tracking is accomplished by stepping through several steps. The first step is for the reference impulse radio units 1802, 1804, 1806, 1808 to begin transmitting pulses in a free-running (random) manner. When a mobile apparatus 1810 or 1812 enters the space covered by network 1800, mobile apparatus 1810 or 1812 begins receiving time-of-arrival (TOA) pulses from the reference radio network. These TOA pulses are converted to ranges, then the ranges are used to determine the XYZ position of mobile apparatus 1810 or 1812 in coordinates using an estimator, such as a least squares-based estimator. If the situation warrants and the conversion possible, the coordinates can be converted to any one of the worldwide coordinates such as Earth Centered Inertial (ECI), Earth Centered Earth Fixed (ECEF), or J2000 (inertial coordinates fixed to year 2000). Global Positioning System (GPS) coordinates may also be used to express positions of mobile apparatuses 1810, 1812.

For ease of reference, in FIGS. 15–20 the below legend applies.

| Symbols and Definitions | |
|---|---|
| ✻ | Receiver Radio (receive only) |
| X | Transmitter Radio (transmit only) |
| ✼ | Transceiver Radio (receive and transmit) |
| $R_i$ | Reference Radio (fixed location) |
| $M_i$ | Mobile Radio (radio being tracked) |
| ⇆ | Duplex Radio Link |
| → | Simplex Radio Link |
| TOA, DTOA | Time of Arrival, Differenced TOA |

Figure 15:
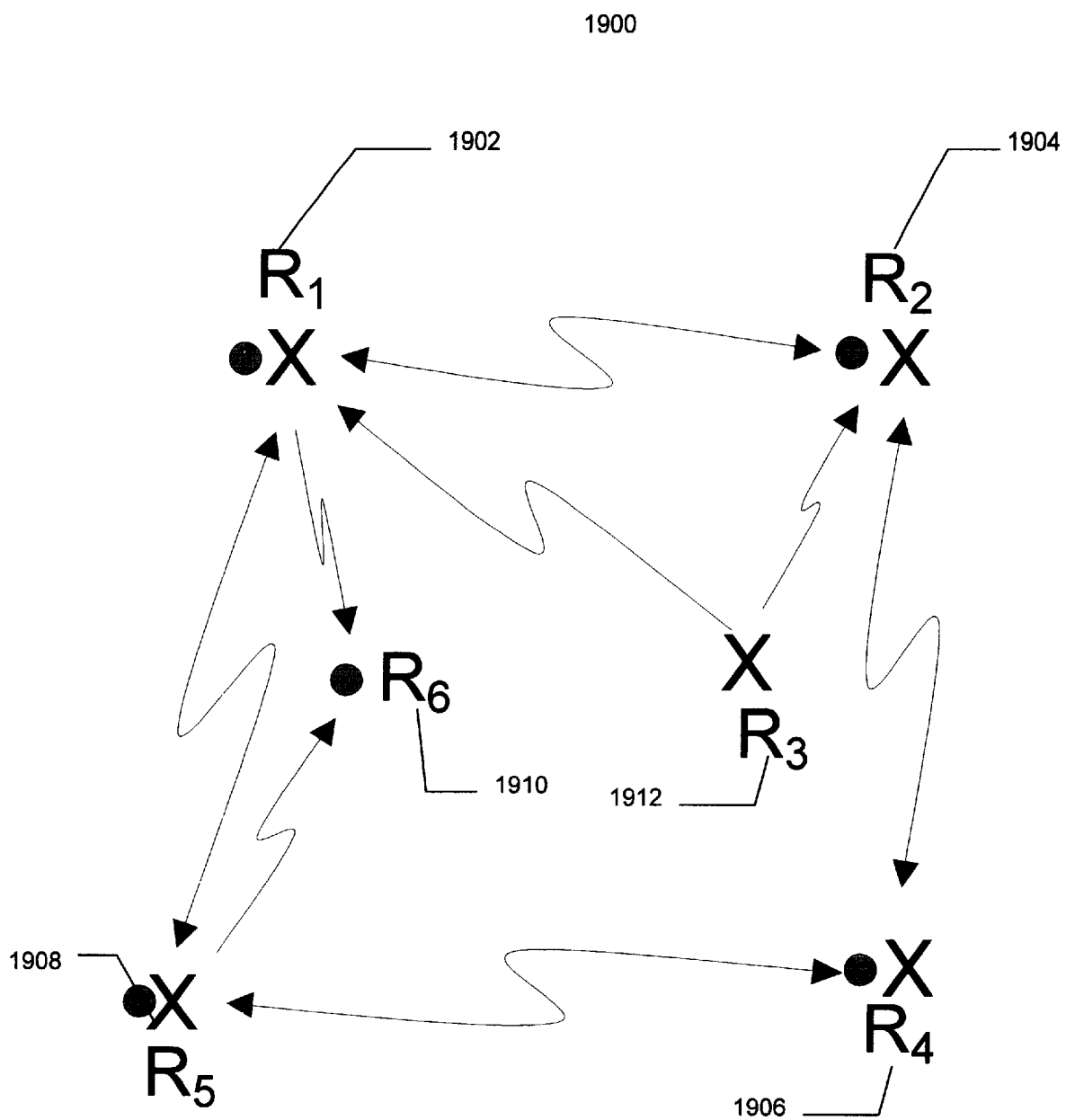
FIG. 15 is a schematic diagram of an impulse radio positioning network utilizing a mixed mode reference radio tracking architecture that can be used in the present invention.

FIG. 15 is a schematic diagram of an impulse radio positioning network utilizing a mixed mode reference radio tracking architecture that can be used in the present invention. In FIG. 15, an impulse radio positioning network 1900 utilizing a mixed mode reference radio tracking architecture includes reference impulse radio units 1902, 1904, 1906, 1908, 1910, 1912 comprised of any combination of transceivers (1902, 1904, 1906, 1908), transmitters (1912), and receivers (1910). Mobile apparatuses (none shown) entering this mixed-mode reference network use whatever reference radios are appropriate to determine their positions.

Figure 16:
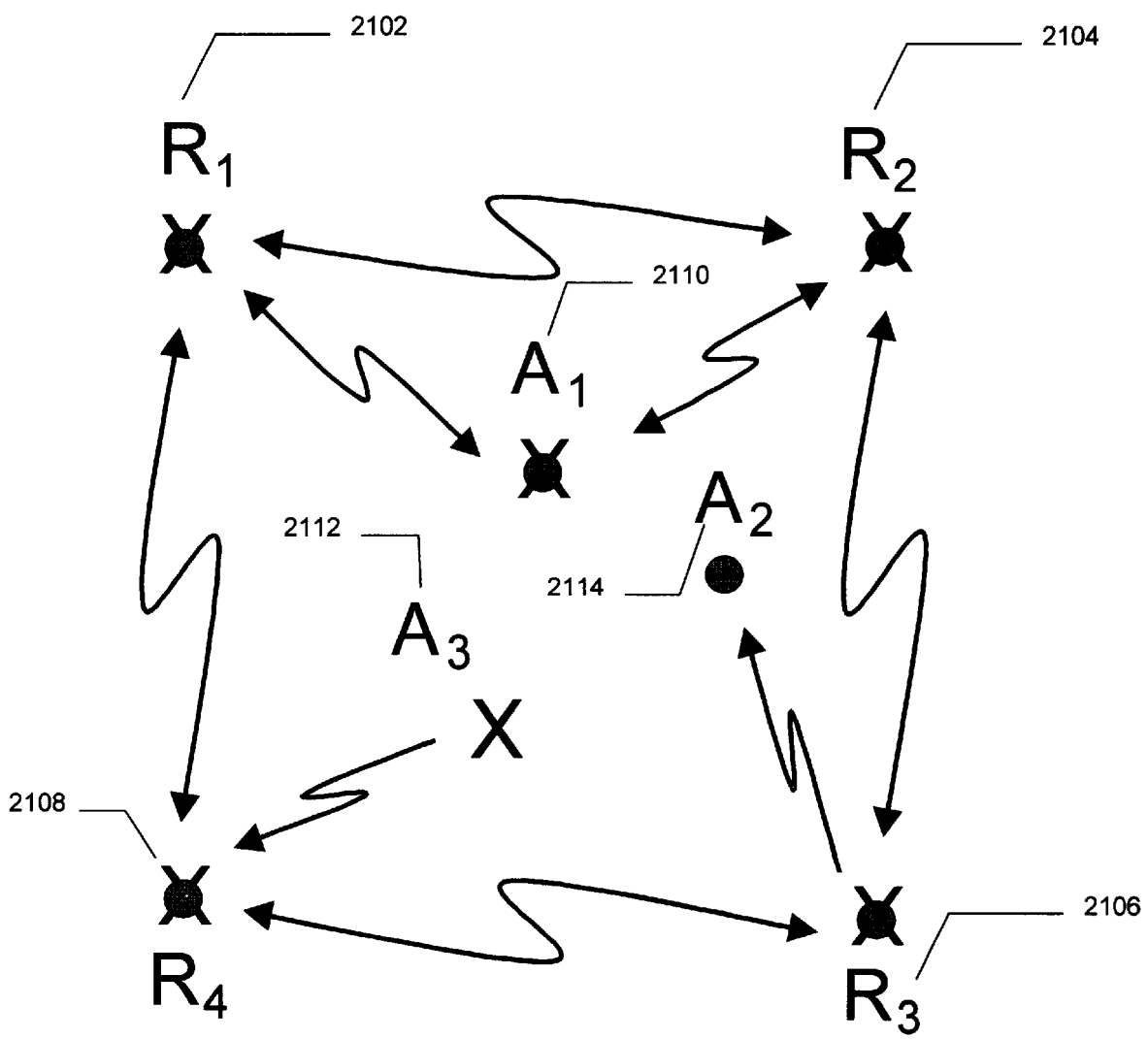
FIG. 16 is a schematic diagram of an impulse radio positioning network utilizing a mixed mode mobile apparatus tracking architecture that can be used in the present invention.

FIG. 16 is a schematic diagram of an impulse radio positioning network utilizing a mixed mode mobile apparatus tracking architecture that can be used in the present invention. In FIG. 16, an impulse radio positioning network 2100 utilizing a mixed mode mobile apparatus tracking architecture includes mobile apparatuses 2110, 2112, 2114 that are mixed mode, and reference impulse radio units 2102, 2104, 2106, 2108 that are preferably time-synchronized. In the illustrative example of FIG. 16, mobile apparatus 2110 is a transceiver, mobile apparatus 2114 is a transmitter and mobile apparatus 2112 is a receiver. Reference impulse radio units 2102, 2104, 2106, 2108 can interact with different types of mobile apparatuses 2110, 2112, 2114 to help in the determination of the positions of the mobile apparatuses.

Figure 17:
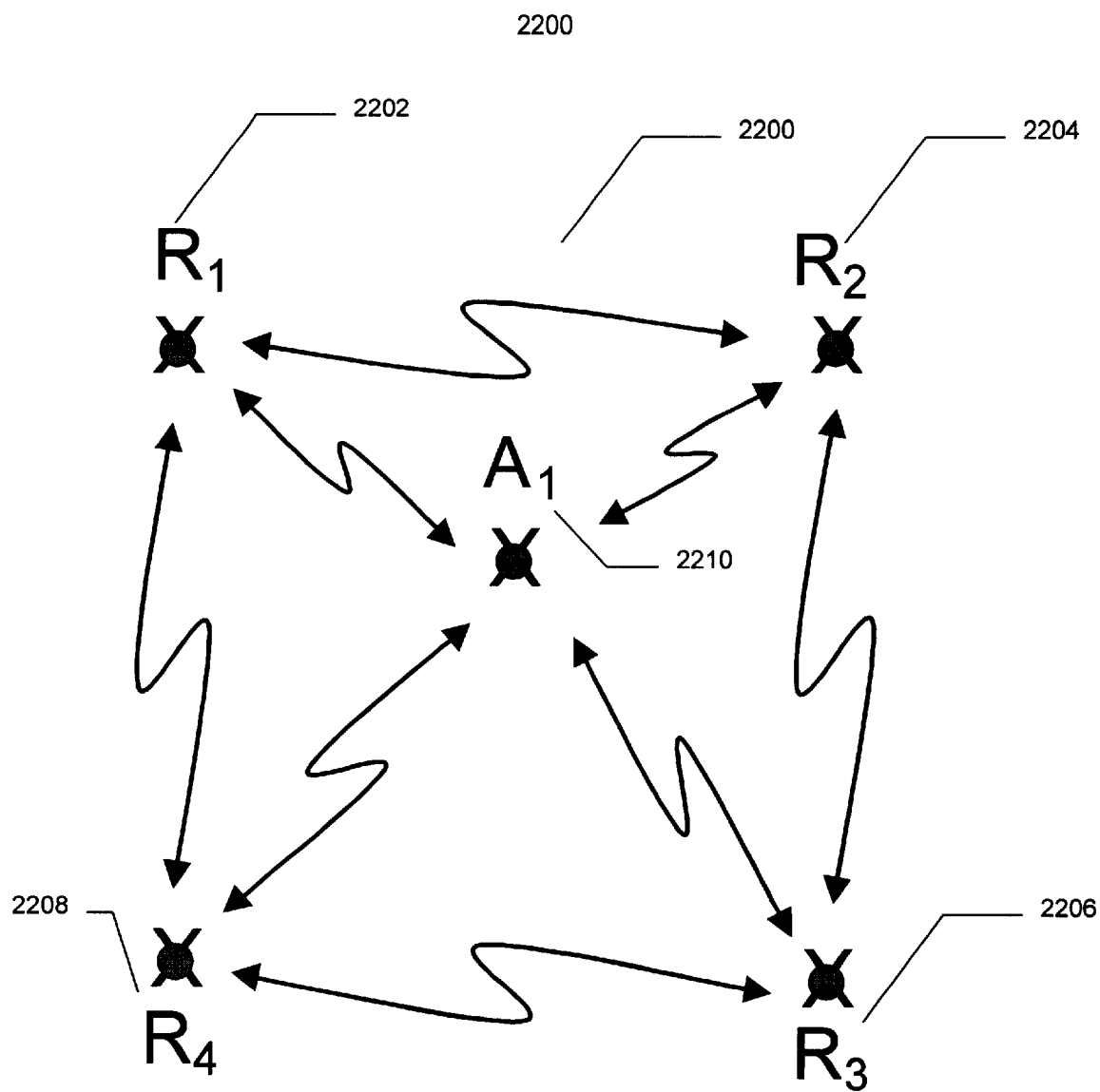
FIG. 17 is a schematic diagram of an exemplary steerable null antennae architecture capable of being used in an impulse radio positioning network in accordance the present invention.

FIG. 17 is a schematic diagram of an exemplary steerable null antennae architecture capable of being used in an impulse radio positioning network in accordance the present invention. Any of the previously described impulse radio positioning networks can implement and use steerable null antennae to help improve the impulse radio distance calculations. In FIG. 17, by way of example, all of reference impulse radio units 2202, 2204, 2206, 2208 (or some of them) can utilize steerable null antenna designs to direct the impulse propagation. An important advantage is the possibility of using fewer reference impulse radio units or improving range and power requirements over networks not using steerable null antennae. Mobile apparatus 2210 can also incorporate and use a steerable null antenna to advantage.

Figure 18:
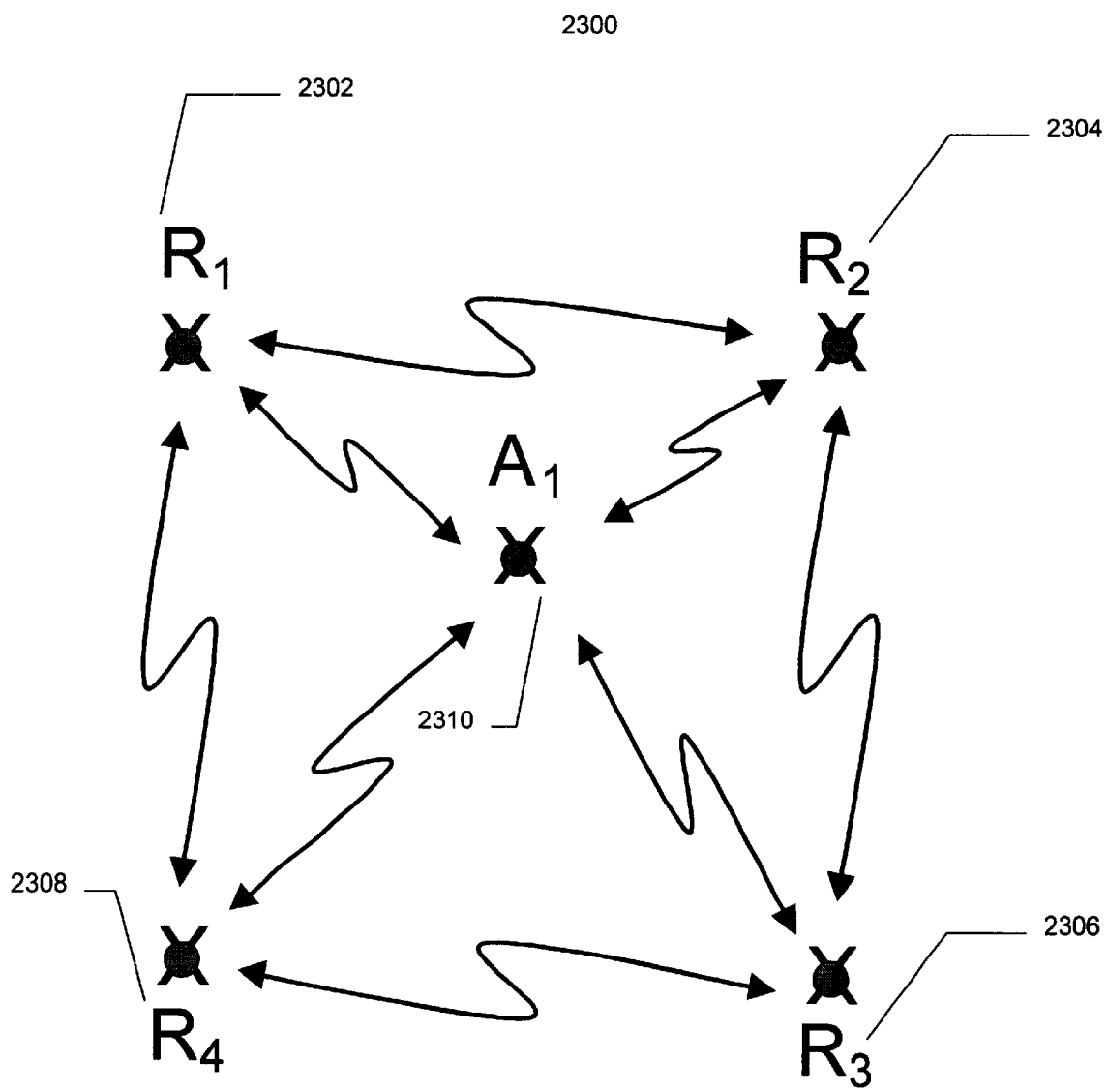
FIG. 18 is a schematic diagram of a specialized difference antennae architecture capable of being used in an impulse radio positioning network in accordance the present invention.

FIG. 18 is a schematic diagram of an exemplary specialized difference antennae architecture capable of being used in an impulse radio positioning network in accordance the present invention. In FIG. 18, reference impulse radio units 2302, 2304, 2306, 2308 use a difference antenna analogous to the phase difference antenna used in GPS carrier phase surveying. Reference impulse radio units 2302, 2304, 2306, 2308 are preferably time synchronized and mobile apparatus 2310 is preferably configured to transmit and receive.

Figure 19:
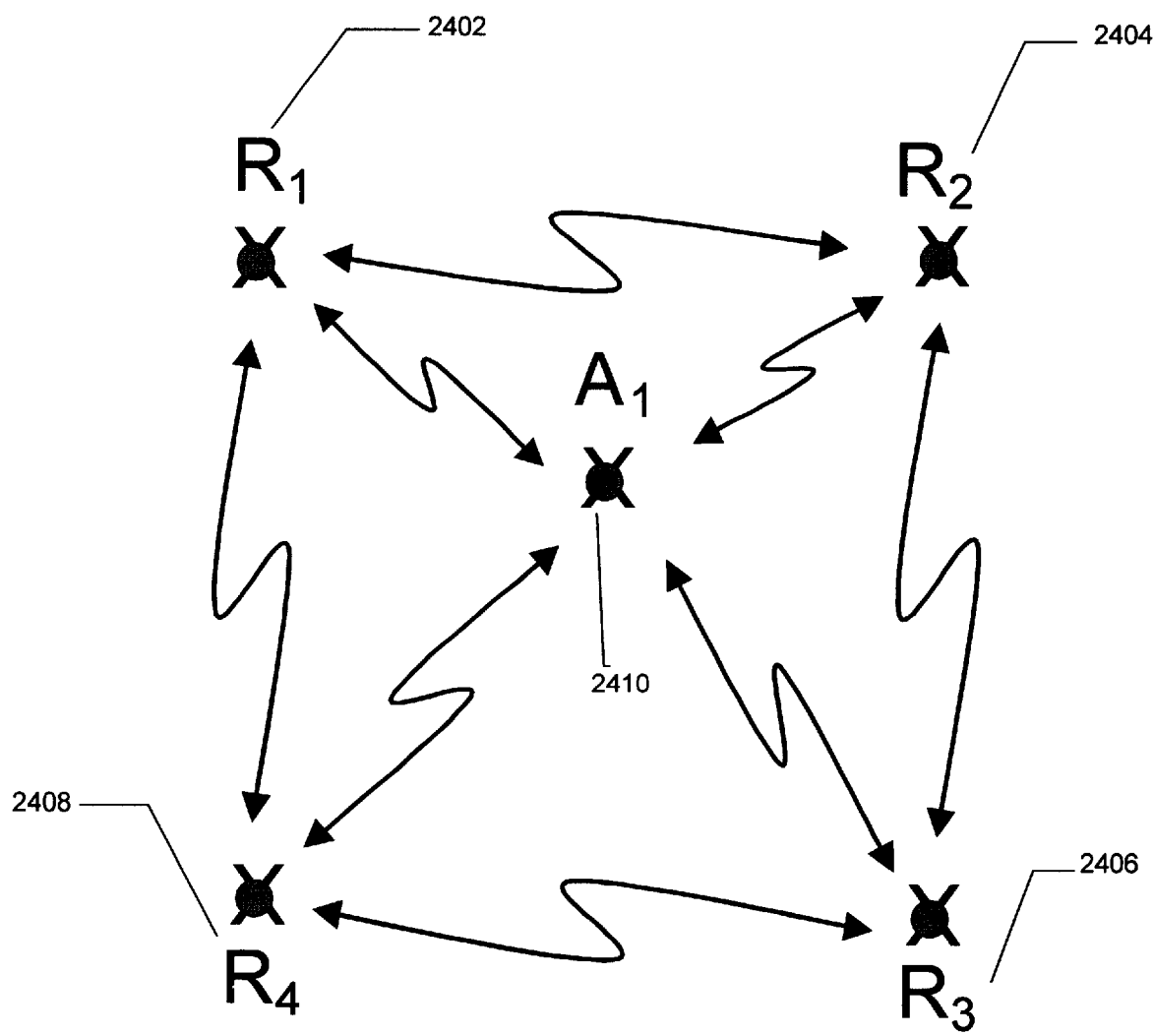
FIG. 19 is a schematic diagram of a specialized directional antennae architecture capable of being used in an impulse radio positioning network in accordance with the present invention.

FIG. 19 is a schematic diagram of an exemplary specialized directional antennae architecture capable of being used in an impulse radio positioning network in accordance with the present invention. In FIG. 19, reference impulse radio units 2402, 2404, 2406, 2408 and mobile apparatus 2410 can incorporate a directional antennae. In addition, reference impulse radio units 2402, 2404, 2406, 2408 are preferably time-synchronized. As with the steerable null antennae design (FIG. 17), implementation of this specialized directional antennae architecture is typically driven by design requirements.

Figure 20:
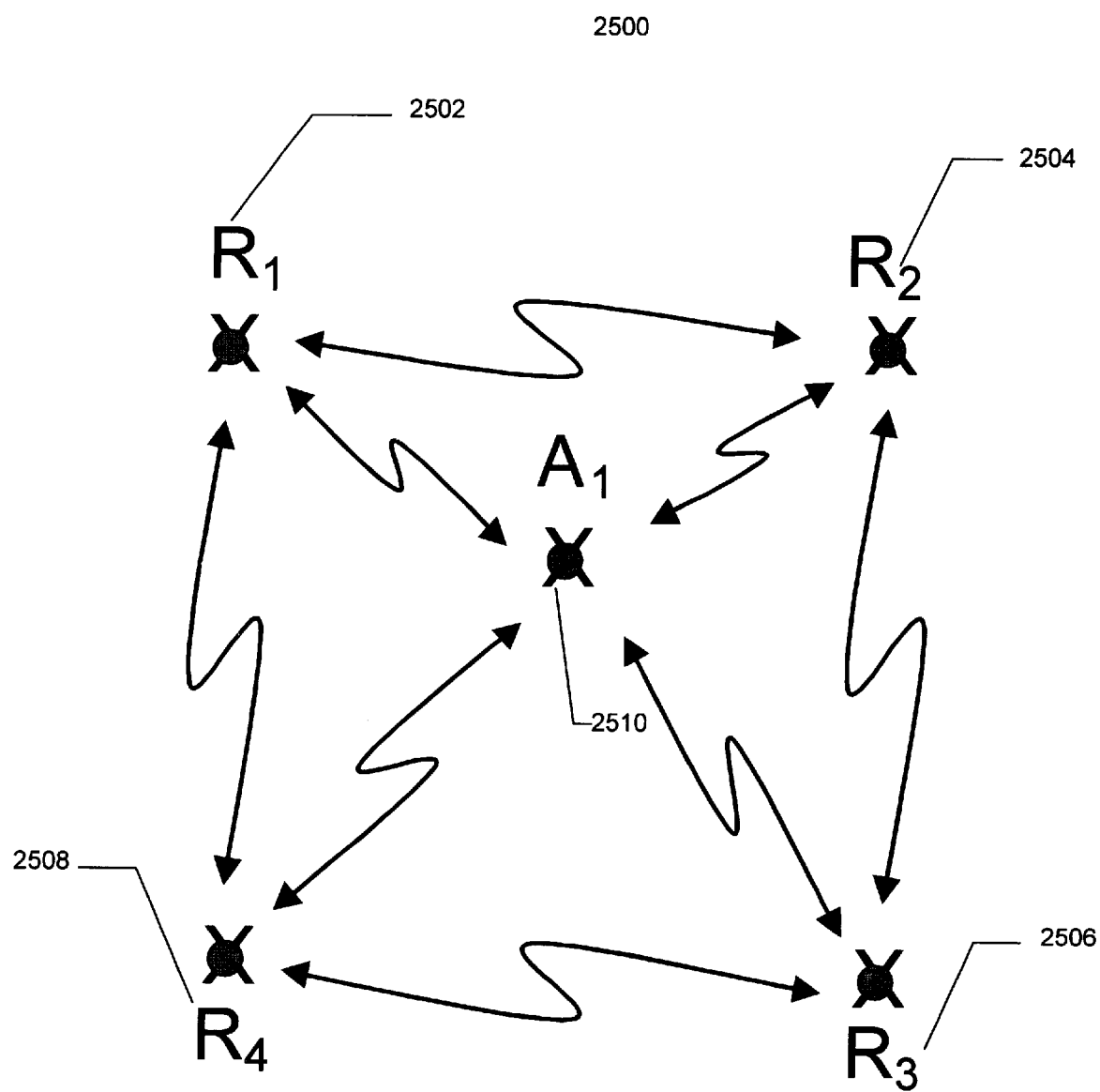
FIG. 20 is a schematic diagram of an amplitude sensing architecture capable of being used in an impulse radio positioning network in accordance with the present invention.

FIG. 20 is a schematic diagram of an amplitude sensing architecture capable of being used in an impulse radio positioning network in accordance with the present invention. In FIG. 20, reference impulse radio units 2502, 2504, 2506, 2508 are preferably time-synchronized. Instead of mobile apparatus 2510 and reference impulse radio units 2502, 2504, 2506, 2508 measuring range using TOA methods (round-trip pulse intervals), signal amplitude is used to determine range. Several alternate implementations can be used, such as measuring the "absolute" amplitude and using a predefined look up table that relates range to "absolute" aplitude, or "relative" amplitude where pulse amplitudes from separate radios are differenced. It should be noted that in this, as with all architectures discussed or illustrated herein, the number of radios shown is for illustrative purposes only and more than one mobile impulse radio can be implemented in the present architecture.

Figure 21:
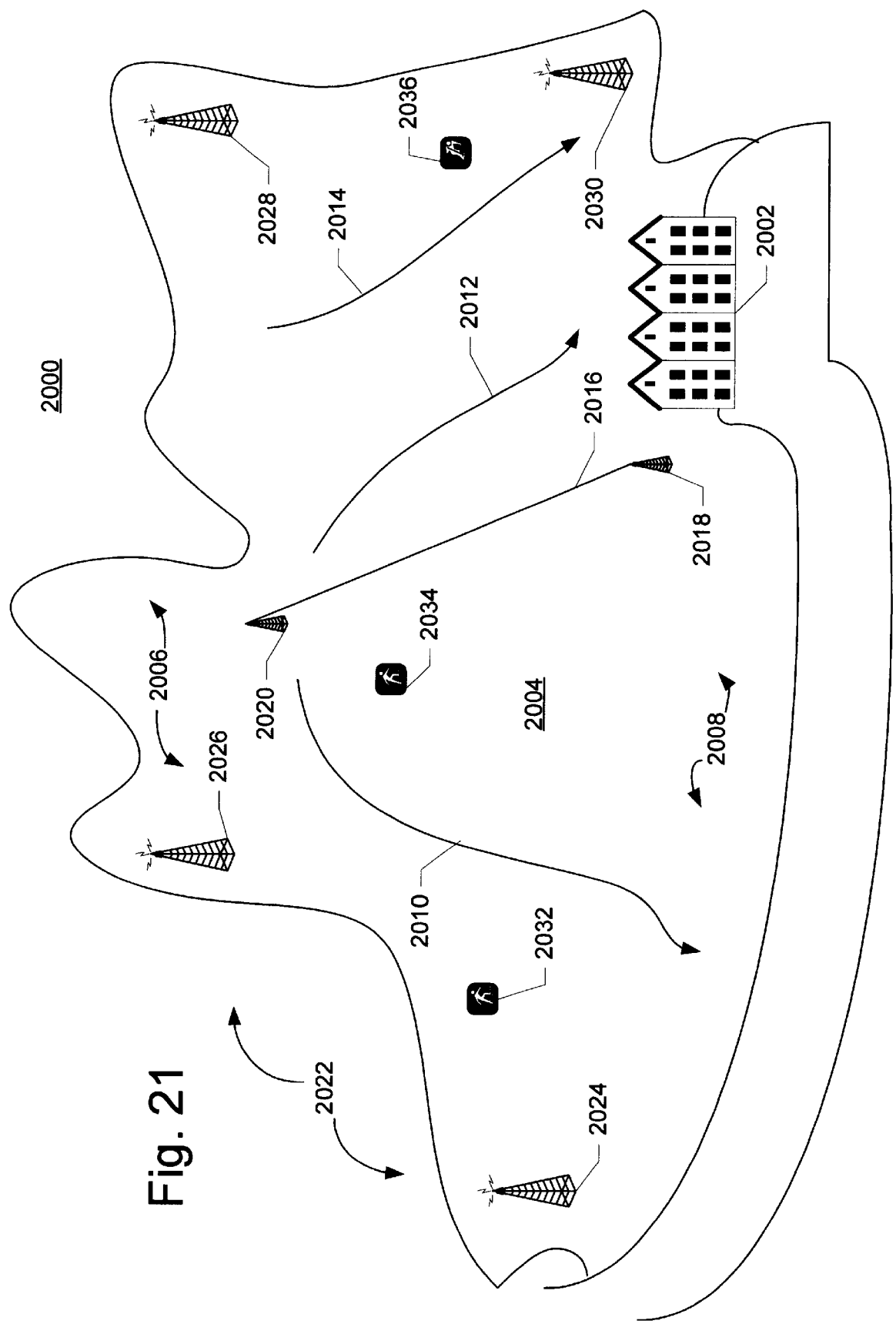
FIG. 21 is a schematic diagram of a ski resort environment in which the present invention may be advantageously employed.

FIG. 21 is a schematic diagram of a ski resort environment in which the present invention may be advantageously employed. In FIG. 21, a ski resort 2000 is situated with a clubhouse 2002 at the base of ski slope 2004. Ski slope 2004 is arranged running from a high elevation 2006 to a low elevation 2008. Clubhouse 2002 is located at low elevation 2008. Ski slope 2004 includes ski runs 2010, 2012, 2014. A ski lift 2016 extends from a lower terminus 2018 at low elevation 2008 to an upper terminus 2020 at high elevation 2006.

An impulse radio network 2022 includes reference impulse radio units 2024, 2026, 2028, 2030. Mobile apparatuses 2032, 2034, 2036 are attached with equipment used or worn by skiers, or are attached to the individual skiers themselves. Reference impulse radio units 2024, 2026, 2028, 2030 are illustrated as being installed in fixed tower structures. Alternatively, some or all of reference impulse radio units 2024, 2026, 2028, 2030 may be portable units used by mobile assets of ski patrol personnel or search personnel in searching for lost skiers or avalanche victims.

Preferably some of reference impulse radio units are fixed and some are mobile. It is likely that there will be more than four such units in an operating system; FIG. 21 is a simplified illustration intended merely for explaining the invention.

Reference impulse radio units 2024, 2026, 2028, 2030 (however they may be deployed) cooperate with mobile apparatuses 2032, 2034, 2036 to locate mobile apparatuses 2032, 2034, 2036 within ski resort 2000. By ensuring that reference impulse units 2024, 2026, 2028, 2030 are not coplanar, three dimensional determination of location of mobile apparatuses 2032, 2034, 2036 may be effected. Mobile apparatuses 2032, 2034, 2036 may be equipped to establish two-way or one-way communications with reference impulse radio units 2024, 2026, 2028, 2030 as described above herein. Providing for two-way communications and equipping mobile apparatuses 2032, 2034, 2036 with appropriate display elements enables skiers to ascertain their own position within ski resort 2000, as well as ensures that an impulse radio identification signal is transmitted at least periodically. By such transmission of an identification signal, network 2022 may determine location of an individual skier or piece of equipment within ski resort 200. Moreover, position determination enables determination when a skier or a piece of equipment (e.g., rental equipment) is leaving ski resort 2000.

Fabricating the apparatus of the present invention in a robust, lightweight, power efficient unit (as by fabricating as an integrated circuit, for example) ensures that use by skiers will be convenient. More important, the portability provided by such small packaging facilitates search efforts in the event of lost skiers, or in the event of an avalanche.

Three-dimensional determination of location allows determination of position as well as depth of avalanche victims in real time. By such straightforward determination of location of victims of an avalanche lives may be saved by obviating the need for such time consuming activities as probing with poles seeking to locate buried victims.

FIG. 22 is a schematic drawing illustrating installation of a mobile apparatus location transmitter in a ski pole handle structure. In FIG. 22, a ski pole 2030 includes a shaft 2032 and a handle 2034. A well 2036 is provided in handle 2034 for receiving a mobile apparatus (not shown in detail in FIG. 22). A cover 2038 controls access to the mobile apparatus installed in well 2036 and permits access to well 26 for changing batteries or other activities.

FIG. 23 is a schematic drawing illustrating installation of a mobile apparatus location transmitter in a ski. In FIG. 23, a ski 2040 (only a portion of ski 2040 is shown) has a cavity 2042 contained therein. Cavity 2042 contains a mobile apparatus (not shown in detail in FIG. 23) for participating in a locating network as described variously herein. Cavity 2042 may alternatively be provided with a cover (not shown in FIG. 23) similar to cover 2038 (FIG. 22), to provide access to cavity 2042, if desired. Other ski-related equipment may have mobile apparatuses affixed thereto or contained therein in manners similar to affixation arrangements illustrated in FIGS. 22–23 to enjoy the benefits of the present invention.

FIG. 24 is a schematic drawing of a wearable mobile apparatus location transmitter device. In FIG. 24, a mobile apparatus unit 2050 is contained within a housing 2052. Housing 2052 is attached with a band 2054. Band 2054 is proportioned to engage an intended user's limb or equipment piece for temporarily affixing mobile apparatus unit 2050 with the user or equipment piece. A fastening mechanism (not shown) such as a buckle, a miniature hook-and-loop fastener (e.g., Velcro™) or another fastening arrangement may be provided for fastening band 2054. Mobile apparatus unit 2050 may also include a display element 2056 when designed for employment with a locating network as described variously herein that provides a display capability for mobile apparatus unit 2050. Mobile apparatus unit 2050 may also include a solar panel 2058 for providing maintenance of battery charge.

From the foregoing, it can be readily appreciated by those skilled in the art that the present invention provides a system, apparatus and method for tracking the location of a prisoner and/or monitoring the vital signs of the prisoner.

Also, the present invention enables prison personnel to communicate with or eavesdrop on a prisoner.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims.

We claim:

1. A system for locating a plurality of objects in a three-dimensional space; the system comprising:
   (a) a digital time-shift modulated ultra wideband impulse radio network; said impulse radio network employing pulse position modulation for indicating information; said impulse radio network including at least three reference impulse radio units and at least one mobile position indicating apparatus; position information relating said at least three reference impulse radio units being recorded by at least one indicating reference impulse radio unit of said at least three reference impulse radio units; said at least three reference impulse radio units being in mutual communication; and
   (b) an affixing structure; said affixing structure affixing a respective mobile position indicating apparatus of said at least one mobile position indicating apparatus with a respective object of said plurality of objects;
   a respective mobile position indicating apparatus of said at least one mobile position indicating apparatus transmitting an impulse radio identifying signal; said identifying signal being received by at least one receiving reference impulse radio unit of said plurality of reference impulse radio units; at least one indicating reference impulse radio unit of said at least three reference impulse radio units cooperating with said at least one receiving reference impulse radio unit in using said identifying signal for developing coordinate information for determining said locating of said respective mobile position indicating apparatus.

2. A system for locating a plurality of objects in a three-dimensional space as recited in claim 1 wherein at least one reference impulse radio unit of said at least three reference impulse radio units is a mobile radio unit.

3. A system for locating a plurality of objects in a three-dimensional space as recited in claim 1 wherein said at least three reference impulse radio units are fixed radio units.

4. A system for locating a plurality of objects in a three-dimensional space as recited in claim 1 wherein said plurality of objects includes a plurality of items of rental equipment and wherein said affixing structure affixes said respective mobile position indicating apparatus to a respective item of said plurality of items of rental equipment.

5. A system for locating a plurality of objects in a three-dimensional space as recited in claim 1 wherein said plurality of objects includes a plurality of skier persons and wherein said affixing structure affixes said respective mobile position indicating apparatus to a respective individual skier person of said plurality of skier persons.

6. A system for locating a plurality of objects in a three-dimensional space as recited in claim 5 where in said affixing structure comprises a band structure for fixably encircling a limb of said respective individual skier person.

7. A system for locating a plurality of objects in a three-dimensional space as recited in claim 5 wherein said respective mobile position indicating apparatus is a receiving mobile position indicating apparatus, said receiving mobile position indicating apparatus at least periodically receiving a location indication from at least one of said at least three reference impulse radio units; said location indication relating to own location of said receiving mobile position indicating apparatus.

8. A system for locating a plurality of objects in a three-dimensional space as recited in claim 7 wherein said receiving mobile position indicating apparatus includes a display element; said receiving mobile position indicating apparatus displaying said own location using said display element.

9. A system for locating equipment pieces in a geographic area; the system comprising:
   (a) a digital time-shift modulated ultra wideband impulse radio network; said impulse radio network employing pulse position modulation for indicating information;
      (1) a plurality of reference impulse radio units; and
      (2) a plurality of mobile position indicating apparatuses; and
   (b) affixing structures associated with said plurality of mobile position indicating apparatuses for affixing respective individual mobile position indicating apparatuses of said plurality of mobile position indicating apparatuses to selected individual equipment pieces of said equipment pieces;
   selected mobile position indicating apparatuses of said plurality of mobile position indicating apparatuses being transmitting mobile position indicating apparatuses; said transmitting mobile position indicating apparatuses transmitting respective impulse radio identifying signals; each said respective identifying signal being related to a respective said transmitting mobile position indicating apparatus; said respective identifying signal being received by at least one receiving reference impulse radio unit of said plurality of reference impulse radio units; at least one indicating reference impulse radio unit of said plurality of reference impulse radio units cooperating with said at least one receiving reference impulse radio unit in using said respective identifying signal for developing position information for determining said locating of said respective transmitting mobile position indicating apparatus.

10. A system for locating equipment pieces in a geographic area as recited in claim 9 wherein at least one reference impulse radio unit of said plurality of reference impulse radio units is a mobile radio unit.

11. A system for locating equipment pieces in a geographic area as recited in claim 9 wherein said plurality of reference impulse radio units are fixed radio units.

12. A system for locating persons in a geographic area; the system comprising:
   (a) a digital time-shift modulated ultra wideband impulse radio network; said impulse radio network employing pulse position modulation for indicating information;
      (1) at least three reference impulse radio units; and
      (2) a plurality of mobile position indicating apparatuses; and
   (b) affixing structures associated with said plurality of mobile position indicating apparatuses for affixing respective individual mobile position indicating apparatuses of said plurality of mobile position indicating apparatuses to selected individuals of said persons; first selected mobile position indicating apparatuses of said plurality of mobile position indicating apparatuses being transmitting mobile position indicating apparatuses; said transmitting mobile position indicating apparatuses transmitting respective impulse radio identifying signals; each said respective identifying signal being related to a respective said transmitting mobile position indicating apparatus; said identifying signal being received by at least one receiving reference impulse radio unit of said at least three reference impulse radio units; at least one indicating reference impulse radio unit of said at least three reference impulse radio units cooperating with said at least one receiving reference impulse radio unit in using said respective identifying signal for developing position information for determining location of said respective transmitting mobile position indicating apparatus.

13. A system for locating persons in a geographic area as recited in claim 12 wherein at least one reference impulse radio unit of said at least three reference impulse radio units is a mobile radio unit.

14. A system for locating persons in a geographic area as recited in claim 12 wherein said at least three reference impulse radio units are fixed radio units.

15. A system for locating persons in a geographic area as recited in one of claims 12–14 wherein said at least one mobile position indicating apparatus is in duplex communication with said at least one reference impulse radio unit and wherein said at least one impulse radio unit communicates a generalized coordinate reference signal to said at least one mobile position indicating apparatus; said at least one mobile position indicating apparatus including a display element for displaying said location of said at least one mobile position indicating apparatus.

16. A system for locating persons in a geographic area as recited in claim 12 wherein second selected mobile position indicating apparatuses of said plurality of mobile position indicating apparatuses are receiving mobile position indicating apparatuses, respective said receiving mobile position indicating apparatuses at least periodically receiving a respective location indication from at least one of said at least three reference impulse radio units; said respective location indication relating to own location of said respective receiving mobile position indicating apparatus.

17. A system for locating persons in a geographic area as recited in claim 12 wherein said respective receiving mobile position indicating apparatuses include a display element; said respective receiving mobile position indicating apparatuses displaying said own location using said display element.

18. A method system for locating a plurality of objects in a three-dimensional space; the method comprising the steps of:
   (a) providing a digital time-shift modulated ultra wideband impulse radio network; said impulse radio network employing pulse position modulation for indicating information; said impulse radio network including at least three reference impulse radio units and at least one mobile position indicating apparatus; position information relating said at least three reference impulse radio units being recorded by at least one indicating reference impulse radio unit of said at least three reference impulse radio units; said at least three reference impulse radio units being in mutual communication;
   (b) providing an affixing structure; said affixing structure affixing a respective mobile position indicating apparatus of said at least one mobile position indicating apparatus with a respective object of said plurality of objects;
   (c) transmitting an impulse radio identifying signal from a respective mobile position indicating apparatus of said at least one mobile position indicating apparatus;
   (d) receiving said identifying signal by at least one receiving reference impulse radio unit of said plurality of reference impulse radio units; and
   (e) operating at least one indicating reference impulse radio unit of said at least three reference impulse radio units in cooperation with said at least one receiving reference impulse radio unit to use said identifying signal to develop coordinate information for determining said locating of said respective mobile position indicating apparatus.

19. A method for locating a plurality of objects in a three-dimensional space as recited in claim 18 wherein said respective mobile position indicating apparatus is a receiving mobile position indicating apparatus, and wherein the method comprises the further step of:
   (f) at least periodically receiving a location indication by said receiving mobile position indicating apparatus from at least one of said at least three reference impulse radio units; said location indication relating to own location of said receiving mobile position indicating apparatus.

20. A method for locating a plurality of objects in a three-dimensional space as recited in claim 19 wherein said receiving mobile position indicating apparatus includes a display element, and wherein the method comprises the further step of:
   (f) displaying said own location at said receiving mobile position indicating apparatus using said display element.

\* \* \* \* \*